(12) United States Patent
Yotani et al.

(10) Patent No.: US 7,811,453 B2
(45) Date of Patent: Oct. 12, 2010

(54) HYDROPHILIC POLYMER MICROPARTICLE, FILLER FOR ION EXCHANGE LIQUID CHROMATOGRAPHY, AND METHOD FOR PRODUCTION OF FILLER FOR ION EXCHANGE LIQUID CHROMATOGRAPHY

(75) Inventors: Takuya Yotani, Yamaguchi (JP); Makoto Takahara, Yamaguchi (JP)

(73) Assignee: Sekisui Chemical Co., Ltd., Osaka (JP)

( * ) Notice: Subject to any disclaimer, the term of this patent is extended or adjusted under 35 U.S.C. 154(b) by 240 days.

(21) Appl. No.: 12/085,936

(22) PCT Filed: Nov. 14, 2006

(86) PCT No.: PCT/JP2006/322670

§ 371 (c)(1),
(2), (4) Date: Jul. 23, 2008

(87) PCT Pub. No.: WO2007/063701

PCT Pub. Date: Jun. 7, 2007

(65) Prior Publication Data
US 2009/0042307 A1 Feb. 12, 2009

(30) Foreign Application Priority Data

| Dec. 2, 2005 | (JP) | ............................ 2005-349543 |
| Dec. 7, 2005 | (JP) | ............................ 2005-354082 |
| Apr. 12, 2006 | (JP) | ............................ 2006-110221 |
| Apr. 27, 2006 | (JP) | ............................ 2006-123569 |
| Jun. 7, 2006 | (JP) | ............................ 2006-158421 |
| Jun. 7, 2006 | (JP) | ............................ 2006-158422 |

(51) Int. Cl.
*B01D 15/08* (2006.01)

(52) U.S. Cl. ..................... 210/198.2; 210/635; 210/656; 210/502.1; 521/25; 521/33; 521/37

(58) Field of Classification Search ................. 210/635, 210/656, 198.2, 502.1; 521/25, 33, 37
See application file for complete search history.

(56) References Cited

U.S. PATENT DOCUMENTS 5,030,352 A * 7/1991 Varady et al. ............ 210/502.1

(Continued)

FOREIGN PATENT DOCUMENTS

JP 63-59463 11/1988

(Continued)

OTHER PUBLICATIONS

PTO Translation No. 97-1373 of Japan Kokai No. 03-118466.*

(Continued)

*Primary Examiner*—Ernest G Therkorn
(74) *Attorney, Agent, or Firm*—Wenderoth, Lind & Ponack, L.L.P.

(57) ABSTRACT

An object of the present invention is to provide a hydrophilic polymer microparticle which shows reduced swelling in an aqueous medium and has an excellent dispersibility in an aqueous medium, a filler for ion-exchange liquid chromatography which can effectively suppress non-specific adsorption of protein and the like, a method for analyzing glycosylated hemoglobin using the filler for ion-exchange liquid chromatography, a method for production of a filler for ion-exchange liquid chromatography that can maintain suppressive effects on swelling, non-specific adsorption and the like for a long period of time, a filler for ion-exchange liquid chromatography produced by the method for production of a filler for ion-exchange liquid chromatography, and a filler for ion-exchange liquid chromatography for glycosylated hemoglobin analysis.

4 Claims, 2 Drawing Sheets

U.S. PATENT DOCUMENTS 5,503,933 A * 4/1996 Afeyan et al. ............... 428/407
6,572,766 B1 * 6/2003 Bergstrom et al. ....... 210/198.2

FOREIGN PATENT DOCUMENTS

| JP | 1-262468 | | 10/1989 |
| JP | 3-118466 | * | 5/1991 |
| JP | 8-7197 | | 1/1996 |
| JP | 2000-088826 | | 3/2000 |
| JP | 2000-88826 | | 3/2000 |
| JP | 2001-91505 | | 4/2001 |
| JP | 2003-207497 | | 7/2003 |
| JP | 2006-102698 | | 4/2006 |

OTHER PUBLICATIONS

PTO Translation No. 10-3838 of Japan Patent No. 2000088826.*
PTO Translation No. 10-3830 of Japan Patent No. 2006102698.*
PTO Translation No. 10-3829 of Japan Patent No. 2003207497.*
International Search Report issued Feb. 27, 2007 in the International (PCT) Application of which the present application is the U.S. National Stage.

* cited by examiner

[Fig. 1]
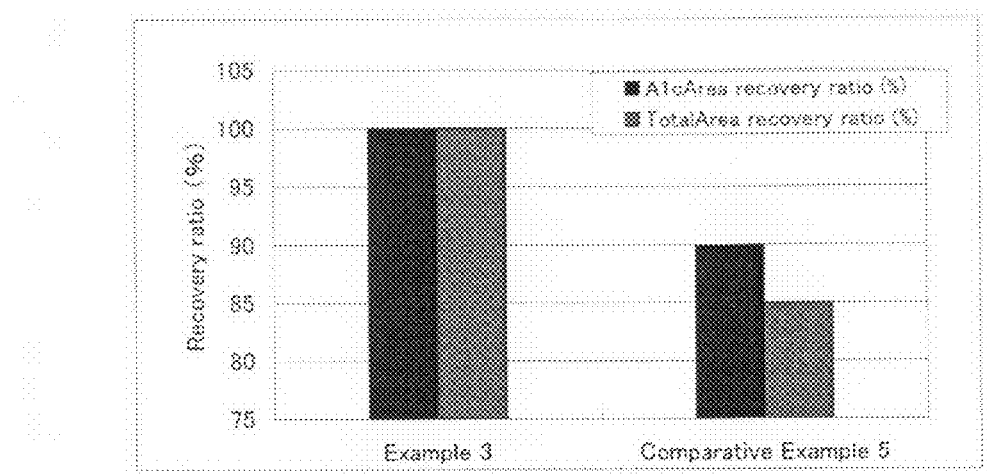
[Fig. 2]
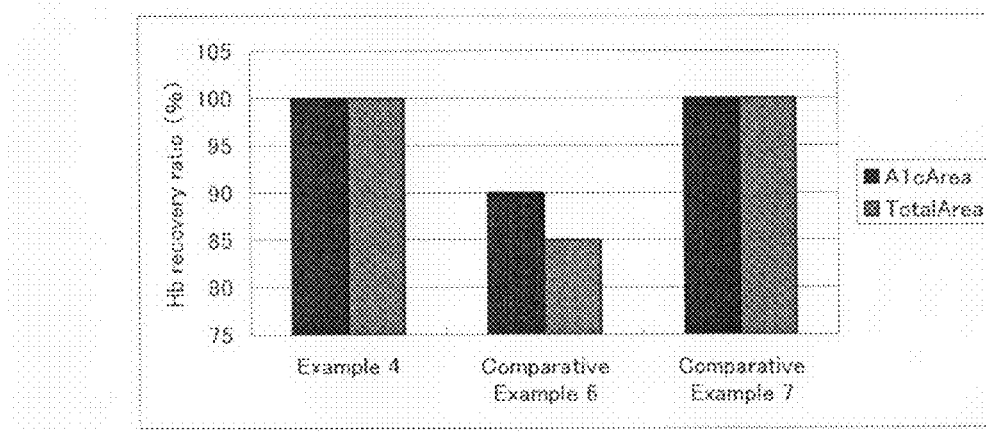
[Fig. 3]
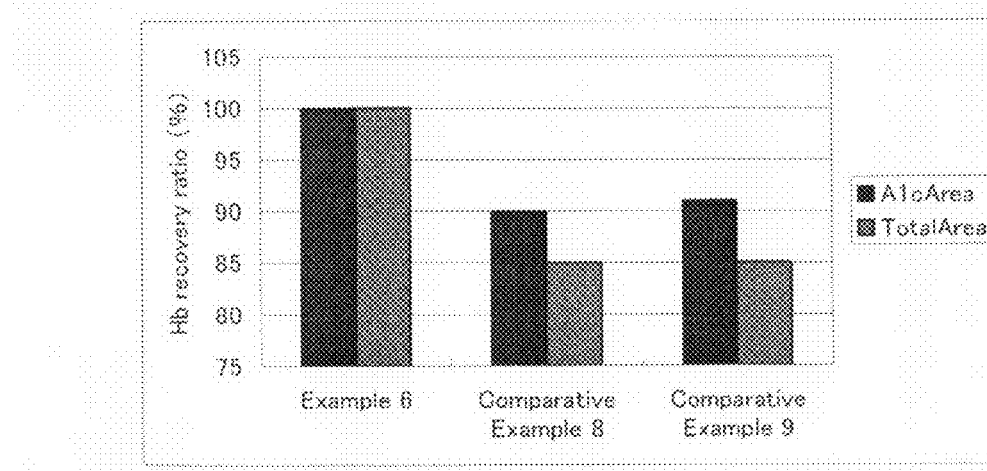

[Fig. 4]
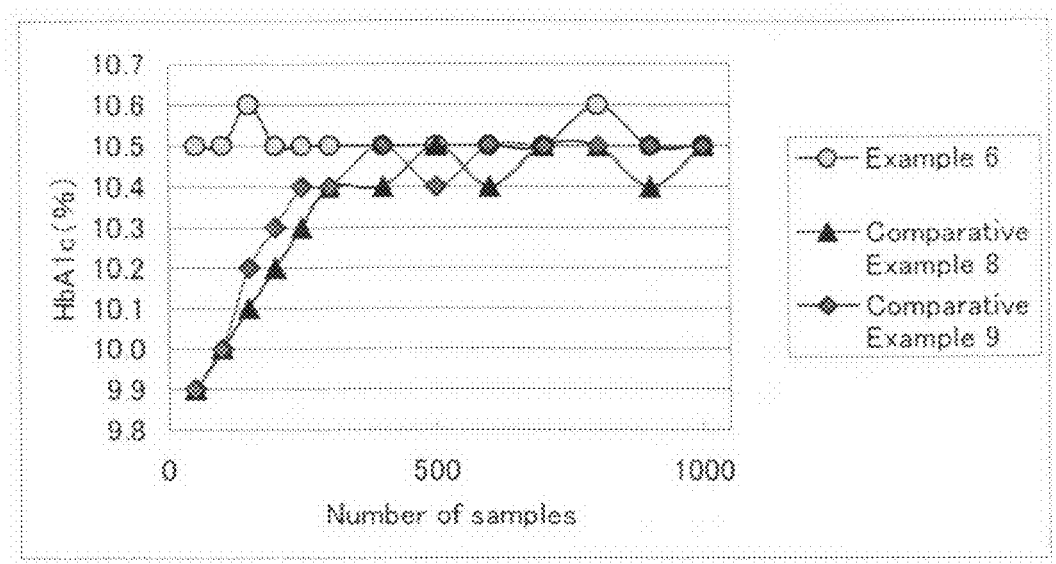
[Fig. 5]
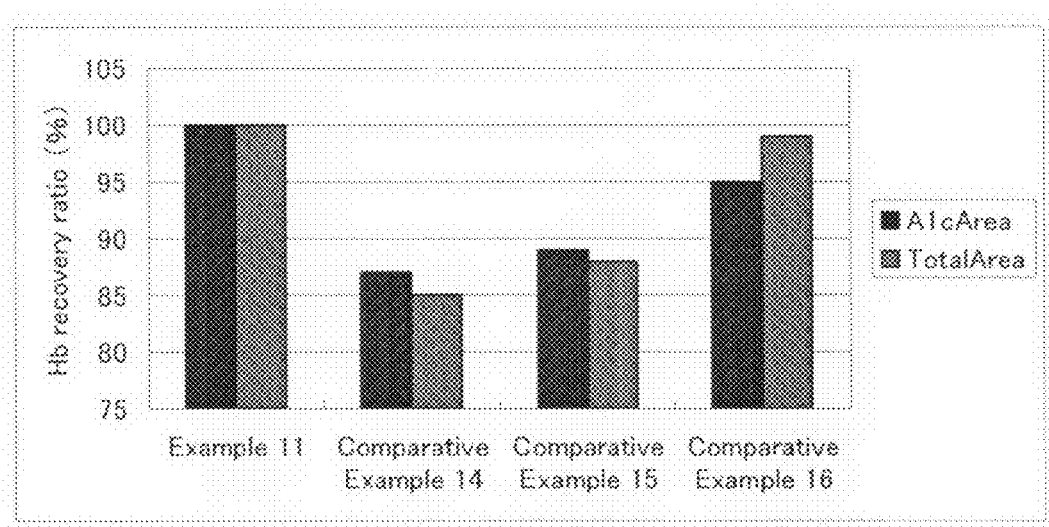

HYDROPHILIC POLYMER MICROPARTICLE, FILLER FOR ION EXCHANGE LIQUID CHROMATOGRAPHY, AND METHOD FOR PRODUCTION OF FILLER FOR ION EXCHANGE LIQUID CHROMATOGRAPHY

This application is a U.S. national stage of International Application No. PCT/JP2006/322670 filed Nov. 14, 2006.

TECHNICAL FIELD

The present invention relates to a hydrophilic polymer microparticle which shows reduced swelling in an aqueous medium and an excellent dispersibility in an aqueous medium, a filler for ion-exchange liquid chromatography which can effectively suppress non-specific adsorption of protein and the like, a method for analyzing glycosylated hemoglobin by using the filler for ion-exchange liquid chromatography, a method for production of a filler for ion-exchange liquid chromatography that can maintain suppressive effects on swelling, non-specific adsorption and the like for a long period of time, a filler for ion-exchange liquid chromatography produced by the method for production of a filler for ion-exchange liquid chromatography, and a filler for ion-exchange liquid chromatography for glycosylated hemoglobin analysis.

BACKGROUND ART

The polymer particles having sub-micron to micron size are used in various applications such as an organic pigment, toner grains, a spacer for liquid crystal, latex microparticles and a filler for ion-exchange liquid chromatography. Out of these, the application to the filler for ion-exchange liquid chromatography has been attracting attention in recent years.

The ion-exchange liquid chromatography method has been known as a highly effective method for separation analysis of various living body-related substances. Especially, an application to a method for analyzing glycosylated hemoglobins (hereinafter, also referred to as hemoglobin A1c) has been attracting attention in recent years.

Hemoglobin A1c is a form of hemoglobin that has blood sugar chemically bound to an N-terminus of a β chain. A proportion of hemoglobin A1c in hemoglobins, that is, a proportion of hemoglobin A1c in a sum of hemoglobin A1c and non-glycosylated hemoglobin is considered to reflect an average blood sugar level in a period of one to two months. Therefore, a hemoglobin A1c value (%) which represents the proportion of hemoglobin A1c has been increasingly used as an indicator for diabetes diagnosis in place of a blood sugar level which may show temporary and rapid fluctuation.

Polymer microparticles to be used in an aqueous medium is required to have a low degree of swelling in the aqueous medium for the purpose of suppressing deformation due to environmental change in the aqueous medium, and also to have the particle surfaces with a high hydrophilicity for the purpose of increasing dispersibility and the like. Polymer microparticles to be used as a filler for ion-exchange liquid chromatography in the ion-exchange liquid chromatography method, in particular, are required to have a significantly low degree of swelling for the purpose of suppressing pressure fluctuation in a column in order to accelerate equilibration.

In order to obtain the polymer microparticles having a low degree of swelling in an aqueous medium, as a conventionally well-known method, a large amount of hydrophobic crosslinking monomers are used to raise a degree of crosslinking.

However, there has been a problem that the microparticles containing the hydrophobic crosslinking monomers have a low dispersibility in an aqueous medium due to its high hydrophobicity of the surface. Furthermore, in case of using microparticles of this kind as a filler for liquid chromatography, there has also been a problem that non-specific adsorption occurs upon its contact with a living body sample such as protein.

Since a hydrophobic interaction is considered to cause the non-specific adsorption, the filler for ion-exchange liquid chromatography is required to have the surface with as high a hydrophilicity as possible.

As a method for increasing the hydrophilicity of the filler for ion-exchange liquid chromatography, examples thereof include a method in which base microparticles of the filler for ion-exchange liquid chromatography are allowed to contain a large amount of hydrophilic monomers, and the like.

However, the large content of the hydrophilic monomers leads to an increase in hydrophilicity of the inside of the filler for ion-exchange liquid chromatography. As a result, the filler for ion-exchange liquid chromatography has a decreased mechanical strength, leading to the following problems: the filler for ion-exchange liquid chromatography can not be used for high-speed separation; measurement accuracy decreases due to swelling of the filler for ion-exchange liquid chromatography itself; and the like.

As a method for solving these problems, for example, there has been known a filler having an ion exchange group introduced into a base material made of a siliceous compound, and a filler obtained by a reaction of crosslinking particles made of an organic synthesis polymer with a compound containing the ion exchange group (Patent Document 1 etc.). Further, there has been known a filler obtained by a reaction of the crosslinking monomer and a compound containing an ion exchange group (Patent Document 2 etc.).

Furthermore, Patent Document 3 discloses a coated polymer microparticle having a layer of hydrophilic polymers formed on a surface of a hydrophobic crosslinked polymer microparticle. The hydrophobic crosslinked polymer microparticle is strongly crosslinked by hydrophobic crosslinking monomers contained therein, so that the hydrophobic crosslinked polymer microparticle has a high mechanical strength and shows reduced swelling. Moreover, it concluded that it is possible to prevent non-specific adsorption of an object to be analyzed and the like, and suppress a degree of swelling while maintaining its hydrophilicity, by forming the layer of the hydrophilic polymer with a thickness of 1 to 30 nm.

However, in practical use, it has been difficult for the hydrophilic polymer with a thickness within the above-mentioned range to prevent exposure of the hydrophobic crosslinked polymer microparticle. As a result, it has been impossible to sufficiently prevent the non-specific adsorption caused by a hydrophobic interaction.

In particular, in case of measuring a substance used for a clinical examination and the like such as glycosylated hemoglobin, since a significantly higher level of measurement accuracy is required, it is necessary to prevent non-specific adsorption caused by the hydrophobic interaction as much as possible.

On the other hand, Patent Document 4 discloses a filler obtained by hydrophilizing filler particle surfaces having an ion exchange group, specifically a hydrophilized filler for ion-exchange liquid chromatography obtained by adsorption of compounds having a hydrophilic group, such as protein, on the filler particle surfaces having the ion exchange group. In the filler for ion-exchange liquid chromatography of this kind, while a base material does not swell or shrink, the hydrophilic surface enables effective prevention of non-specific adsorption of protein and the like. However, in the case where hydrophilic compounds are fixed by the physical adsorption as described above, although the high performance is demonstrated in an early stage of use, long-term use causes detachment of the hydrophilic compounds from the filler particle surfaces, leading to a problem that retention times and measured values may be varied. Moreover, there is also a problem that lot to lot variation in the hydrophilic compounds to be used for the adsorption causes variations in retention times and measured values.

Patent Document 1: Japanese Kokai Publication No. Hei-1-262468

Patent Document 2: Japanese Kokoku Publication No. Sho-63-59463

Patent Document 3: Japanese Kokoku Publication No. Hei-8-7197

Patent Document 4: Japanese Kokai Publication No. 2001-91505

DISCLOSURE OF THE INVENTION

Problems to be Solved by the Invention

In light of the above-mentioned problems, an object of the present invention is to provide a hydrophilic polymer microparticle which shows reduced swelling in an aqueous medium and has an excellent dispersibility in an aqueous medium, a filler for ion-exchange liquid chromatography which can effectively suppress non-specific adsorption of protein and the like, a method for analyzing glycosylated hemoglobin using the filler for ion-exchange liquid chromatography, a method for production of a filler for ion-exchange liquid chromatography that can maintain suppressive effects on swelling, non-specific adsorption and the like for a long period of time, a filler for ion-exchange liquid chromatography produced by the method for production of a filler for ion-exchange liquid chromatography, and a filler for ion-exchange liquid chromatography for glycosylated hemoglobin analysis.

The present invention is a hydrophilic polymer microparticle, which has a $D_W/D_A$ ratio of 2.0 or less, the $D_W$ representing a particle diameter of the hydrophilic polymer microparticle dispersed in water, the $D_A$ representing a particle diameter of the hydrophilic polymer microparticle dispersed in acetone, each of the particle diameters being measured by a particle size distribution analyzer after the hydrophilic polymer microparticle is dispersed in water or acetone, subjected to irradiation with ultrasonic waves for 15 minutes, and allowed to stand at a temperature of 25° C. for 240 hours for equilibration; and has a contact angle with water of 70° or less, the contact angle being measured using a contact angle measurement apparatus at a temperature of 25° C. by forming a droplet of pure water on a single layer of the hydrophilic polymer microparticles arranged with no space therebetween.

Moreover, the present invention is a filler for ion-exchange liquid chromatography, which comprises a base microparticle and an ion exchange group present on the surface of the base microparticle, the filler having a $D_W/D_A$ ratio of 2.0 or less, the $D_W$ representing a particle diameter of the particle dispersed in water, the $D_A$ representing a particle diameter of the particle dispersed in acetone, each of the particle diameters being measured by a particle size distribution analyzer after the particle is dispersed in water or acetone, subjected to irradiation with ultrasonic waves for 15 minutes, and allowed to stand at a temperature of 25° C. for 240 hours for equilibration; and having a contact angle with water of 60° or less, the contact angle being measured using a contact angle measurement apparatus at a temperature of 25° C. by forming a droplet of pure water on a single layer of the filler for ion-exchange liquid chromatography arranged with no space therebetween.

The present invention is a filler for ion-exchange liquid chromatography, which comprises an ion exchange group, has a contact angle with water of 60° or less, and is not coated with a hydrophilic compound on the surface.

Moreover, the present invention is a filler for ion-exchange liquid chromatography, which comprises a hydrophobic crosslinked polymer particle including a synthetic organic polymer, and a layer of a hydrophilic polymer having an ion exchange group copolymerized on the surface of the hydrophobic crosslinked polymer particle, the filler having the uppermost surface processed with hydrophilic treatment using an ozone water.

Furthermore, the present invention is a method for production of a filler for ion-exchange liquid chromatography, which comprises a hydrophilization process including hydrophilization by washing the surface of a filler particle having an ion exchange group with an ozone water having a dissolved ozone gas concentration of 20 ppm or more, the hydrophilization process including carrying out treatment by an advanced oxidation method.

Hereinafter, the present invention is described in detail.

The present inventors conducted intensive studies to find out that it is possible to obtain a hydrophilic polymer microparticle which shows reduced swelling in an aqueous medium and has an excellent dispersibility in an aqueous medium by setting the $D_W/D_A$ ratio (hereinafter, also referred to as swelling ratio) of the polymer microparticle and the contact angle of the surface of polymer microparticle with water within a certain range, and thus completed the present invention.

The polymer microparticle of the present invention has a $D_W/D_A$ ratio of 2.0 or less, the $D_W$ representing a particle diameter of the hydrophilic polymer microparticle dispersed in water, the $D_A$ representing a particle diameter of the polymer microparticle dispersed in acetone, each of the particle diameters being measured by a particle size distribution analyzer after the polymer microparticle is dispersed in water or acetone, subjected to irradiation with ultrasonic waves for 15 minutes and allowed to stand at a temperature of 25° C. for 240 hours for equilibration.

Generally, polymer microparticles have a tendency to shrink in an organic solvent and to swell in an aqueous medium regardless of the extent of swelling. Therefore, a polymer microparticle having a high degree of swelling in the aqueous medium has a great value of the $D_W/D_A$ ratio, whereas a polymer microparticle having a low degree of swelling in the aqueous medium has a small value of the $D_W/D_A$ ratio.

Since a polymer microparticle having a $D_W/D_A$ ratio of more than 2.0 has a too high degree of swelling in the aqueous media, use of the polymer microparticle, for example, in a filler for liquid chromatography is not practical due to a large pressure fluctuation and a long time required for equilibration. Moreover, use thereof in a water-based paint is not practical due to deteriorated workability caused by an increase in viscosity before painting. The preferable lower limit is 1.0, and the preferable upper limit is 1.8.

The above-mentioned particle size distribution analyzer is not particularly limited, and examples thereof include Accu-Sizer 780 (produced by Particle Sizing Systems, Inc.) and the like.

The hydrophilic polymer microparticle of the present invention has a contact angle with water of 70° or less, the contact angle measured using a contact angle measurement apparatus at a temperature of 25° C. by forming a droplet of pure water on a single layer of the hydrophilic polymer microparticles arranged with no space therebetween.

The contact angle measurement is used as a means of evaluating hydrophilicity or hydrophobicity of a surface of a material such as a polymer material. A material with a smaller contact angle with water is considered to have a higher hydrophilicity. In the present invention, by setting the upper limit of the contact angle with water to 70°, the hydrophilicity is significantly improved, resulting in an improved dispersibility in water. Moreover, in case of using the hydrophilic polymer microparticles of the present invention as a filler for liquid chromatography, contact of a living body sample such as protein thereto rarely causes non-specific adsorption. In addition, in case of use in a water based paint, an efficiency of painting is improved owing to the excellent dispersibility. The preferable upper limit is 60°.

Example of the above-mentioned contact angle measurement apparatus include an automatic contact angle measurement apparatus such as Dropmaster500 produced by Kyowa Interface Science Co., Ltd.

The contact angle with water can be measured by using a contact angle measurement apparatus of a kind mentioned above, according to a method ($\theta/2$ method) for measuring a contact angle based on an angle formed by a straight line passing through a lateral end point and an apex of the droplet with a solid surface, and the like. Specifically, the following method can be exemplified.

The dried hydrophilic polymer microparticles are placed on the double-stick tape attached to a slide glass to form a single layer with no space therebetween under microscopic observation, and then excessive hydrophilic polymer microparticles are removed by an air spray to fix the hydrophilic polymer microparticles on the double-stick tape. A droplet of 1 μL of pure water at a temperature of 25° C. is prepared and placed onto the hydrophilic polymer microparticles fixed on the slide glass, and the contact angle is calculated according to the $\theta/2$ method using the contact angle measurement apparatus. In the case where the contact angle is less than 90°, since the placed droplet tends to spread, the contact angle after the placement of the droplet decreases with a lapse of time. For this reason, the evaluation is carried out using a contact angle value measured 0.5 seconds after the placement of the droplet.

It is possible to obtain the hydrophilic polymer microparticle of the present invention which hardly swells in an aqueous medium by setting the swelling ratio within the above-mentioned range, and the hydrophilic polymer microparticle of the present invention which has an excellent dispersibility in the aqueous medium by setting the contact angle with water within the above-mentioned range.

As the hydrophilic polymer microparticle having a swelling ratio within the above-mentioned range and a contact angle with water within the above-mentioned range, specific examples thereof include a microparticle which comprises a hydrophobic crosslinked polymer made of hydrophobic crosslinking monomers with a water solubility of 5% by weight or less and/or hydrophobic non-crosslinking monomers, and has the uppermost surface processed with hydrophilization.

The hydrophobic crosslinked polymer may be any of the followings: a hydrophobic crosslinked polymer (for example, a polymer made solely of ethylene glycol dimethacrylate, a polymer made solely of divinylbenzene and the like) obtained by homopolymerizing one kind of hydrophobic crosslinking monomers with a water solubility of 5% or less; a hydrophobic crosslinked polymer (for example, a copolymer made of ethylene glycol dimethacrylate and trimethyrolpropane trimethacrylate, a copolymer made of divinylbenzene and divinyltoluene, and the like) obtained by copolymerizing two or more kinds of hydrophobic crosslinking monomers with a water solubility of 5% by weight or less; a hydrophobic crosslinked polymer (for example, a copolymer made of ethylene glycol dimethacrylate, trimethyrolpropane trimethacrylate and butylmethacrylate, a copolymer made of divinylbenzene and styrene, and the like) obtained by copolymerizing at least one kind of hydrophobic crosslinking monomers with a water solubility of 5% by weight or less and at least one kind of hydrophobic non-crosslinking monomers.

The above-mentioned hydrophobic crosslinking monomer with a water solubility of 5% by weight or less is not particularly limited as long as it has two or more vinyl groups in one monomer molecule, and examples thereof include di(meth)acrylic ester such as ethylene glycol di(meth)acrylate, polyethylene glycol di(meth)acrylate, propylene glycol di(meth)acrylate and polypropylene glycol di(meth)acrylate; tri(meth)acrylic ester or tetra(meth)acrylic ester such as tetramethyrolmethane tri(meth)acrylate, trimethyrolpropane tri(meth)acrylate, tetramethyrolmethane tetra(meth)acrylate; an aromatic compound such as divinylbenzene, divinyltoluene, divinylxylene and divinylnaphthalene, and the like.

Here, the water solubility is a value calculated based on measurement of mass of monomers dissolved in water by a double bond (PSDB) method using hydrogen flame gas chromatography after 20 mL of the monomer is added to 100 mL of water, stirred for 10 minutes×3 times at a room temperature and allowed to stand in a warmer at a temperature of 20° C. overnight.

The hydrophobic non-crosslinking monomer with a water solubility of 5% by weight or less is not particularly limited, as long as it is a non-crosslinking polymerizable organic monomer with hydrophobicity, and examples thereof include (meth)acrylic ester such as methyl(meth)acrylate, ethyl(meth)acrylate, propyl(meth)acrylate, isopropyl(meth)acrylate, butyl(meth)acrylate and t-butyl(meth)acrylate, a styrene-type monomer such as styrene and methylstyrene, and the like.

In case of using the above-mentioned hydrophobic crosslinked polymer formed by copolymerization of the hydrophobic crosslinking monomers with a water solubility of 5% by weight or less, and the hydrophobic non-crosslinking monomers with a water solubility of 5% by weight or less, a preferable amount of the hydrophobic non-crosslinking monomer with a water solubility of 5% by weight or less to be used is 50 parts by weight or less to 100 parts by weight of the hydrophobic crosslinking monomer with a water solubility of 5% by weight or less.

A method for hydrophilizing the uppermost surface is not particularly limited, and examples thereof include a method for carrying out, on the surface of polymer microparticles, ozone water treatment, ozone gas treatment, plasma treatment, corona treatment, surface oxidation treatment by a hydrogen peroxide solution, sodium hypochlorite and the like; a method including physical adsorption or chemical bonding, on the surface of polymer microparticles, of a hydrophilic compound derived from living body such as protein and polysaccharide, or a hydrophilic polymer compound such as polyvinyl alcohol, a polyvinyl pyrrolidone, polyacrylic acid, and phosphatide polymer, and the like.

Out of these, considering workability during preparation, easiness of carrying out lot management, performance maintenance over time and the like, ozone water treatment is preferably used.

The above-mentioned ozone water refers to a solution of ozone gas dissolved in water.

Although ozone has powerful oxidizing properties, it is considerably difficult to carry out hydrophilization treatment by uniformly oxidizing surfaces of polymer microparticles by ozone gas.

However, use of an ozone water allows easy oxidation and the hydrophilization treatment of surfaces of polymer microparticles only by dispersing the polymer microparticles in the ozone water. As a result of the hydrophilization treatment, a part having a structure with hydrophobicity is oxidized to contain a hydrophilic group (—OH, —CHO, —COOH and the like).

Although a concentration of the ozone gas dissolved in the ozone water is not particularly limited, the preferable lower limit is 20 ppm. An ozone water with a dissolved ozone gas concentration of less than 20 ppm requires a longer time for the hydrophilization treatment or can not carry out the sufficient hydrophilization treatment. Therefore, in case of using the polymer particles hydrophilized using an ozone water with a dissolved ozone gas concentration of less than 20 ppm in a filler for liquid chromatography, the polymer particles may fail to suppress non-specific adsorption of a substance to be measured and the like. The more preferable lower limit is 50 ppm. The preferable upper limit of the concentration is not particularly limited.

A method for preparing the ozone water is not particularly limited, and examples thereof include a method, as described in Japanese Kokai Publication No. 2001-330969 and the like, for making a contact of ozone gas with material water through an ozone gas permeable membrane that only allows permeation of gas and prevents permeation of liquid, and the like.

In addition, an advanced oxidation method is preferably employed upon carrying out the ozone water treatment. The advanced oxidation method refers to a method for enhancing the oxidizing power of the ozone water, and is conducted by employing one, or a combination of two or more methods for promoting decomposition of the dissolved ozone, such as irradiation with ultraviolet rays, irradiation with ultrasonic waves and addition of alkaline water.

By carrying out the treatment by the advanced oxidation method, decomposition of the dissolved ozone is promoted, leading to an increase in an amount of hydroxy radical generated by the decomposition of ozone. The hydroxy radical generated as described above is expected to enable further enhancement of effects of hydrophilization treatment owing to its further higher oxidizing power than that of ozone. Employment of the advanced oxidation method enables further promotion of generation of hydrophilic groups (—OH, —CHO, —COOH and the like) on the surfaces of the polymer microparticles.

Here, in the case where a polymer microparticle, which is not subjected to the hydrophilization treatment, has a contact angle of the surface with water of 70° or less, the hydrophilization treatment is not particularly required.

An average particle diameter of the hydrophilic polymer microparticles of the present invention is not particularly limited, and a particle diameter according to a purpose is applicable.

Although particle size distribution (CV value) of the hydrophilic polymer microparticles of the present invention is not particularly limited, the preferable upper limit is 40%. Hydrophilic polymer microparticles with a particle size distribution of more than 40% are not practical. The more preferable upper limit is 15%.

The filler for ion-exchange liquid chromatography of the present invention comprises a filler for ion-exchange liquid chromatography, which comprises a base material particle and an ion exchange group present on the surfaces of the base material particles, the filler having a $D_W/D_A$ ratio of 2.0 or less, the $D_W$ representing a particle diameter of the hydrophilic polymer microparticle dispersed in water, the $D_A$ representing a particle diameter of the hydrophilic polymer microparticle dispersed in acetone, each of the particle diameters being measured by a particle size distribution analyzer after the hydrophilic polymer microparticle is dispersed in water or acetone, subjected to irradiation with ultrasonic waves for 15 minutes, and allowed to stand at a temperature of 25° C. for 240 hours for equilibration; and having a contact angle with water of 60° or less, the contact angle measured using a contact angle measurement apparatus at a temperature of 25° C. by forming a droplet of pure water on a single layer of the hydrophilic polymer microparticles arranged with no space therebetween.

Hereinafter, the filler for ion-exchange liquid chromatography of the present invention is described in detail.

The present inventors conducted intensive studies to find out that it is possible to obtain a filler for ion-exchange liquid chromatography which shows reduced swelling in an aqueous medium and effectively suppresses non-specific adsorption of protein and the like by setting the $D_W/D_A$ ratio (hereinafter, also referred to as swelling ratio) and the contact angle of the surface of the filler for ion-exchange liquid chromatography with water within a certain range, and thus completed the filler for ion-exchange liquid chromatography of the present invention.

The filler for ion-exchange chromatography of the present invention has a $D_W/D_A$ ratio of 2.0 or less, the $D_W$ representing a particle diameter of the hydrophilic polymer microparticle dispersed in water, the $D_A$ representing a particle diameter of the hydrophilic polymer microparticle dispersed in acetone, each of and the particle diameters being measured by a particle size distribution analyzer after the hydrophilic polymer microparticle is dispersed in water or acetone, subjected to irradiation of ultrasonic waves for 15 minutes, and allowed to stand at a temperature of 25° C. for 240 hours for equilibration.

Generally, a filler for ion-exchange liquid chromatography has a tendency to shrink in an organic solvent and to swell in an aqueous medium regardless of the extent. Therefore, a filler having a high degree of swelling in the aqueous medium has a great value of the $D_W/D_A$ ratio, whereas a filler having a low degree of swelling in the aqueous medium has a small value of the $D_W/D_A$ ratio.

Since a filler having a $D_W/D_A$ ratio of more than 2.0 has a too high degree of swelling in the aqueous media, use of the filler may not be practical due to large pressure fluctuation in a column and a long time required for equilibration. The preferable lower limit is 1.0, and the preferable upper limit is 1.8.

The above-mentioned particle size distribution analyzer is not particularly limited, and examples thereof include Accu-Sizer 780 (produced by Particle Sizing Systems, Inc.) and the like.

The upper limit of the contact angle of the filler for ion-exchange chromatography of the present invention with water is 60°, the contact angle measured using a contact angle measurement apparatus at a temperature of 25° C. by forming a droplet of pure water on a single layer of the hydrophilic polymer microparticles arranged with no space therebetween.

The contact angle measurement is used as a means of evaluating hydrophilicity or hydrophobicity of a surface of a material such as a polymer material. A material with a smaller contact angle with water is considered to have a higher hydrophilicity. In the present invention, by setting the upper limit of the contact angle with water to 60°, the hydrophilicity is significantly improved, resulting in less non-specific adsorption upon a contact of a living body sample such as protein thereto. The preferable upper limit is 50°.

Here, the contact angle with water can be measured by the same method using the same contact angle measurement apparatus as those used for the hydrophilic polymer microparticles of the present invention.

It is possible to obtain the filler for ion-exchange chromatography of the present invention which hardly swells in an aqueous medium by setting the swelling ratio within the above-mentioned range, and the filler for ion-exchange chromatography of the present invention which does not cause decrease in measurement accuracy due to the non-specific adsorption upon its contact with a living body sample such as protein by setting the contact angle with water within the above-mentioned range.

The filler for ion-exchange liquid chromatography of the present invention comprises a base microparticle and an ion exchange group present on the surface of the base microparticle, like the well-known filler for ion-exchange liquid chromatography.

As the filler for ion-exchange liquid chromatography having a swelling ratio within the above-mentioned range and a contact angle with water within the above-mentioned range, specific examples thereof include a filler which comprises a base microparticle including a hydrophobic crosslinked polymer made of hydrophobic crosslinking monomers with a water solubility of 5% by weight or less and/or hydrophobic non-crosslinking monomers, and an ion exchange group present on the surface of the base microparticle, and has the uppermost surface processed with hydrophilization treatment.

Here, detailed explanation of a method for carrying out the hydrophilization treatment of the hydrophobic crosslinked polymer and the upper most surface is omitted, since the same method as the one employed for the hydrophilic polymer microparticle of the present invention is employed.

The above-mentioned hydrophilization treatment may be carried out before the ion exchange group is introduced in the surface of the base material microparticle, or after the ion exchange group is induced on the surface of the base material microparticle.

Here, in the case where a filler for ion-exchange liquid chromatography, which is not subjected to the hydrophilization treatment, has a contact angle of the surface with water of 60° or less, the hydrophilization treatment is not particularly required.

The above-mentioned ion exchange group is not particularly limited, and examples thereof include a sulfonic acid group, a carboxyl group, a phosphate group and the like. Out of these, the sulfonic acid group is preferably used, since use thereof enables maintenance of performance over a long period of time, and produces high effects on analysis of hemoglobin A1c and the like.

A method for introducing the ion exchange group is not particularly limited, and examples thereof include a method for copolymerizing monomers having an ion exchange group on surfaces of base microparticles as described in Japanese Kokoku Publication No. Hei-8-7197, and the like.

The hydrophilic monomer having the ion exchange group is not particularly limited, and may be selected from polymerizable monomers soluble in an aqueous medium according to intended use of the filler for ion-exchange chromatography of the present invention. In case of use in cation exchange liquid chromatography, examples thereof include a monomer having a carboxyl group such as acrylic acid and methacrylic acid, a monomer having a sulfonic acid group such as styrene sulfonic acid, arylsulfonic acid, and 2-(meth)acrylamide-2-methyl propane sulfonic acid, and a monomer having a phosphate group such as ((meth)acryloyloxyethyl) acid phosphate and (2-(meth)acryloyloxyethyl) acid phosphate. Out of these, a monomer having a sulfonic acid group is preferably used. In case of use in anion exchange liquid chromatography, examples thereof include a monomer having an amino group such as dimethylamino ethyl(meth)acrylate, diethylamino ethyl(meth)acrylate and arylamine, and the like.

In addition, as long as one or more kinds of monomers having the ion exchange group are included, a hydrophilic monomer without the ion exchange group may be copolymerized therewith in order to increase hydrophilicity.

Moreover, a method for introducing the ion exchange group by copolymerization of monomers having a functional group on the surface of the base microparticle and a reaction of the functional group with a compound having the ion exchange group may also be employed.

Although an average particle diameter of the filler for ion-exchange liquid chromatography of the present invention is not particularly limited, the preferable lower limit is 0.1 μm and the preferable upper limit is 20 μm. The filler with an average particle diameter of less than 0.1 μm may cause insufficient separation due to excessively high pressure in a column, and the filler having an average particle diameter of more than 20 μm may cause insufficient separation due to excessively large dead volume in a column.

Although particle size distribution (CV value) of the filler for ion-exchange liquid chromatography of the present invention is not particularly limited, the preferable upper limit is 40%. A filler with particle size distribution of more than 40% may cause insufficient separation due to excessively large dead volume in a column. The more preferable upper limit is 15%.

The filler for ion-exchange liquid chromatography of the present invention can be used for measurement of hemoglobins (Hb) such as glycosylated hemoglobin. This method for measuring glycosylated hemoglobin is also one aspect of the present invention.

Specifically, for example, hemoglobin can be measured by filling up a well-known column with the filler for ion-exchange liquid chromatography of the present invention and sending an eluent and a sample to be measured into the obtained column under a predetermined condition.

As the above-mentioned eluent, a conventionally well-known eluent can be used, and examples thereof include a solution containing, as a component, organic acid, inorganic acid or a salt of these, and the like.

A filler for ion-exchange liquid chromatography of the present invention of another embodiment is a filler having an ion exchange group, and a contact angle with water of 60° or less; and being not coated with a hydrophilic compound on the surface. Hereinafter, the filler for ion-exchange liquid chromatography of another embodiment of the present invention is described in detail.

The present inventors conducted intensive studies to find out that it is possible to obtain a filler capable of sufficiently preventing non-specific adsorption caused by a hydrophobic interaction and thereby having high measurement accuracy by setting the contact angle of the surface of the filler with water within a certain range without coating the surface with a hydrophilic compound, and thus completed the present invention.

The filler for ion-exchange liquid chromatography of another embodiment of the present invention (hereinafter, also referred to simply as filler of another embodiment of the present invention) has a contact angle with water of 60° or less.

The contact angle measurement is used as a means of evaluating hydrophilicity or hydrophobicity of a surface of a material such as a polymer material. A material with a smaller contact angle with water is considered to have higher hydrophilicity.

Therefore, the hydrophilicity is significantly increased by setting the contact angle with water to be 60° or less, and it is possible to sufficiently suppress the non-specific adsorption of a substance to be measured such as protein caused by a hydrophobic interaction. The contact angle with water is preferably 50° or less.

The contact angle with water can be measured by using an automatic contact angle measurement apparatus according to a method (θ/2 method) for measuring a contact angle based on an angle formed by a straight line passing through a lateral end point and an apex of the droplet with a solid surface, and the like.

The filler of another embodiment of the present invention has the surface uncoated with a hydrophilic compound. Here, in the description "a surface uncoated with a hydrophilic compound" refers to a base surface of the filler without physical adsorption or chemical bond of a hydrophilic compound derived from a living body such as protein and polysaccharide, or a hydrophilic compound of a synthetic polymer such as polyvinyl alcohol, poly vinyl pyrrolidone and phosphatide polymer formed thereon.

Since the surface is not coated with the hydrophilic compound, the filler has no hydrophilic compound to fall off and is able to maintain the hydrophilicity over a long period of time.

A method for setting the contact angle of the filler of another embodiment of the present invention with water to be 60° or less is not particularly limited, and examples thereof include a method for carrying out, on the base material of the filler, ozone water treatment, ozone gas treatment, plasma treatment, corona treatment, surface oxidation treatment by a hydrogen peroxide solution, sodium hypochlorite and the like. Out of these, the hydrophilization treatment by ozone water is preferably used.

In the case where a base material of a filler, which is not subjected to the hydrophilization treatment, has a contact angle to the surface of 60° or less, the hydrophilization treatment is not particularly required.

The base material of the filler of another embodiment of the present invention is not particularly limited, and examples thereof include a synthetic polymer microparticle containing polymerizable monomers, an inorganic microparticle and the like. However, a base material comprising hydrophobic crosslinked polymer particles including a synthetic organic polymer and a layer of a hydrophilic polymer having an ion exchange group copolymerized on the surfaces of the hydrophobic crosslinked polymer particles is preferably used. In addition, in case of using a base material of this kind, the hydrophilization treatment is preferably carried out on the uppermost surface with the ozone water.

In case of using the filler with the base material of this kind, use of hydrophobic particles enables maintenance of a mechanical strength as a filler, and the hydrophilization treatment in addition to coating of the surfaces of the particles with the hydrophilic layer enable sufficient prevention of non-specific adsorption caused by a hydrophobic interaction. As a result, the obtained filler can have high measurement accuracy to be significantly effective for various separation analyses.

The filler of another embodiment of the present invention has an ion exchange group. Examples of the ion exchange group include a sulfonic acid group, a carboxyl group, a phosphate group and the like. Out of these, the sulfonic acid group is preferably used.

A further another embodiment of the filler of another embodiment of the present invention includes a filler for ion-exchange liquid chromatography comprising a hydrophobic crosslinked polymer particle including a synthetic organic polymer and a layer of hydrophilic polymer having an ion exchange group copolymerized on the surface of the above-mentioned hydrophobic crosslinked polymer particle, with the uppermost surface processed with hydrophilic treatment using ozone water.

The filler of further another embodiment of the present invention comprises a hydrophobic crosslinked polymer particle including a synthetic organic polymer, and a layer of a hydrophilic polymer having the ion exchange group copolymerized on the surface of the above-mentioned hydrophobic crosslinked polymer particle.

The hydrophobic crosslinked polymer may be any of the followings: a hydrophobic crosslinked polymer obtained by homopolymerizing one kind of hydrophobic crosslinking monomers; a hydrophobic crosslinked polymer obtained by copolymerizing two or more kinds of hydrophobic crosslinking monomers; and a hydrophobic crosslinked polymer obtained by copolymerizing at least one kind of hydrophobic crosslinking monomers and at least one kind of hydrophobic non-crosslinking monomers.

The above-mentioned hydrophobic crosslinking monomer is not particularly limited as long as it has two or more vinyl groups in each molecule of the monomer, and examples thereof include di(meth)acrylic ester such as ethylene glycol di(meth)acrylate, polyethylene glycol di(meth)acrylate, a propylene glycol di(meth)acrylate, and polypropylene glycol di(meth)acrylate; tri(meth)acrylic ester or tetra(meth)acrylic ester such as tetramethyrolmethane tri(meth)acrylate, trimethyrolpropane tri(meth)acrylate, and tetramethyrol methane tetra(meth)acrylate; and an aromatic compound such as divinylbenzene, divinyltoluene, divinylxylene and divinylnaphthalene, and the like.

The above-mentioned hydrophobic non-crosslinking monomer is not particularly limited, as long as it is a non-crosslinking polymerizable organic monomer having hydrophobicity, and examples thereof include (meth)acrylic ester, such as methyl(meth)acrylate, ethyl(meth)acrylate, propyl(meth)acrylate, isopropyl(meth)acrylate, butyl(meth)acrylate, and t-butyl(meth)acrylate; and a styrene-type monomer such as styrene and methylstyrene, and the like.

In case of using the hydrophobic crosslinked polymer obtained by copolymerizing the hydrophobic crosslinking monomers and the hydrophobic non-crosslinking monomers, the hydrophobic crosslinked polymer preferably contains 10 parts by weight or more of the hydrophobic crosslinking monomer to 100 parts by weight of all the monomers, and more preferably contains 20 parts by weight or more of the hydrophobic crosslinking monomer.

The hydrophilic polymer having the ion exchange group is made of the hydrophilic monomers having the ion exchange group, and required to contain one or more kinds of the hydrophilic monomers having the ion exchange group. Accordingly, as a method for production of the hydrophilic polymer having the ion exchange group, examples thereof include a method for polymerizing hydrophilic monomers having the ion exchange group alone, and a method for copolymerizing hydrophilic monomers having the ion exchange group and hydrophilic monomers without the ion exchange group, and the like.

The hydrophilic monomer having the ion exchange group is not particularly limited, and may be selected from polymerizable monomers soluble in an aqueous medium according to intended use of the filler of the present invention. In case of use in cation exchange liquid chromatography, examples thereof include a monomer having a carboxyl group such as acrylic acid and methacrylic acid, a monomer having a sulfonic acid group such as styrene sulfonic acid, arylsulfonic acid, and 2-(meth)acrylamide-2-methyl propane sulfonic acid, and a monomer having a phosphate group such as ((meth)acryloyloxyethyl) acid phosphate and (2-(meth)acryloyloxyethyl) acid phosphate, and the like. Out of these, a monomer having a sulfonic acid group is preferably used. In case of use in anion exchange liquid chromatography, examples thereof include a monomer having an amino group such as dimethylamino ethyl(meth)acrylate, diethylamino ethyl(meth)acrylate and arylamine, and the like.

The hydrophilic monomer without the ion exchange group is not particularly limited, and may be selected from polymerizable monomers soluble in an aqueous medium according to intended use of the filler for ion-exchange chromatography of the present invention. Examples thereof include 2-hydroxyethyl(meth)acrylate, glycerol mono(meth)acrylate, polyethylene glycol mono(meth)acrylate, methoxypolyethylene glycol mono(meth)acrylate, acryl amide, methacrylamide, vinyl pyrrolidone and the like.

In case of using the hydrophilic monomer having the ion exchange group and the hydrophilic monomer without the ion exchange group mixed together, a mixing ratio thereof is not particularly limited, and may be determined according to the required amount of the ion exchange group.

The filler of further another embodiment of the present invention has the uppermost surface processed with hydrophilization treatment using the ozone water.

Ozone is known to have a high reactivity with a double bond. Ozone reacts with a double bond to form an ozonide, which is a reaction intermediate, and then forms a carboxyl group and the like.

In the present invention, since a structure exposed to the surface of the hydrophobic crosslinked polymer after coating with the hydrophilic polymer is supposed to be an unreacted vinyl group, which has a double bond, oxidation treatment can be effectively carried out by ozone.

The above-mentioned ozone water refers to a solution of ozone gas dissolved in water.

Here, detailed explanation of a concentration of the dissolved ozone in the ozone water and a method for preparing the ozone water are omitted, since the same concentration and the same method as those used for the filler for ion-exchange chromatography of the present invention are employed.

The contact angle of the filler of further another embodiment of the present invention with water is preferably 60° or less similarly to the above, and more preferably 50° or less.

A method for production of the filler of further another embodiment of the present invention is not particularly limited, as long as coated polymer particles are produced by a conventionally well-known method and hydrophilization treatment is carried out by dispersing the coated polymer particles in an ozone water.

Although an average particle diameter of each of the fillers of another embodiment and further another embodiment of the present invention is not particularly limited, the preferable lower limit is 0.1 µm and the preferable upper limit is 20 µm. A filler with an average particle diameter of less than 0.1 µm may cause insufficient separation due to excessively high pressure in a column, and a filler with an average particle diameter of more than 20 µm may cause insufficient separation due to excessively large dead volume in a column.

Although particle size distribution (CV value) of each of the fillers of another embodiment and further another embodiment of the present invention is not particularly limited, the preferable upper limit is 40%. A filler with particle size distribution of more than 40% may cause insufficient separation due to excessively large dead volume in a column. The more preferable upper limit is 15%.

The fillers of another embodiment and further another embodiment of the present invention can be used for measurement of hemoglobins (Hb) such as glycosylated hemoglobin. This method for measuring glycosylated hemoglobin is also one aspect of the present invention.

Specifically, for example, hemoglobin can be measured by filling up a well-known column with the filler of another embodiment of the present invention or the filler of further another embodiment of the present invention and sending an eluent and a sample to be measured into the obtained column under a predetermined condition.

As the above-mentioned eluent, a conventionally well-known eluent can be used, and examples thereof include a solution containing, as a component, organic acid, inorganic acid or a salt of these, and the like.

The method for production of a filler for ion-exchange chromatography of the present invention is a method for production of a filler for ion-exchange chromatography, which comprises a hydrophilization process including hydrophilization by washing the surface of a filler particle having an ion exchange group with an ozone water having a dissolved ozone gas concentration of 20 ppm or more, the hydrophilization process including carrying out treatment by an advanced oxidation method.

Hereinafter, the present invention is described in detail.

The present inventors so far have found out that it is possible to produce a filler for ion-exchange liquid chromatography which does not swell or shrink even in an aqueous medium and can effectively prevent non-specific adsorption of protein and the like, by washing the filler particle surfaces having an ion exchange group with the ozone water to hydrophilize only the surfaces of the filler particles.

However, even in case of employing the above-mentioned method, the surface of the obtained filler for ion-exchange liquid chromatography sometimes fails to be sufficiently hydrophilized.

Therefore, after further intensive studies, the present inventors found out that, in the hydrophilization process using the ozone water, treatment by an advanced oxidation method accelerates decomposition of dissolved ozone, and hydroxy radical generated by the decomposition enables further enhancement of effects of the hydrophilization treatment, and completed the present invention.

In the method for production of a filler for ion-exchange liquid chromatography of the present invention, only the surfaces of filler particles are hydrophilized by carrying out the hydrophilization process using the ozone water having a concentration of dissolved ozone gas of 20 ppm or more to wash the filler particle surfaces having the ion exchange group. Since the ozone water has powerful oxidizing properties and the dissolved ozone gas is gradually decomposed without residue, the ozone water is used in various applications such as resist removal of a semiconductor described in Japanese Kokai Publication No. 2001-33069 and decomposition treatment of a toxic substance described in Japanese Kokai Publication No. 2003-024464.

Therefore, in case of carrying out hydrophilization treatment by such a method as described above, since only the surface portion which makes a direct contact with the ozone water is hydrophilized, no swelling or shrinkage occurs even in an aqueous medium, while no non-specific adsorption of protein and the like to the hydrophilized surface occurs. Furthermore, owing to chemical hydrophilization treatment, the hydrophilicity can be maintained over a long period of time without a hydrophilic compound falling off unlike a physical hydrophilization treatment method.

In the present invention, the hydrophilization process includes treatment by an advanced oxidation method.

In this description, the advanced oxidation method refers to a method for enhancing the oxidizing power of the ozone water, and is conducted by employing one, or a combination of two or more methods for promoting decomposition of the dissolved ozone such as irradiation with ultraviolet rays, irradiation with ultrasonic waves and addition of alkaline water.

By carrying out the treatment by the advanced oxidation method, decomposition of the dissolved ozone is promoted, leading to an increase in the amount of the hydroxy radical generated by the decomposition of ozone. The hydroxy radical generated as described above is expected to enable further enhancement of effects of the hydrophilization treatment owing to its further higher oxidizing properties than that of ozone. Employment of the advanced oxidation method enables further promotion of generation of hydrophilic groups (—OH, —CHO, —COOH and the like) on the surfaces of the polymer microparticles.

As the treatment by the advanced oxidation method, a method for using ozone water having a pH of 7.0 or more and irradiating with ultrasonic waves is preferably employed.

Generally ozone water has a low pH of 4.0 to 5.0. An ozone water having a high pH shows unstable dispersibility, and thus decomposition of the dissolved ozone is accelerated. Moreover, irradiation with ultrasonic waves further accelerates generation of hydroxy radical by cavitation effects produced upon the irradiation with ultrasonic waves. Therefore, a combination of these factors enables further enhancement of the effects of the hydrophilization treatment.

Although a method for adjusting the pH of the ozone water to 7.0 or more is not particularly limited, examples thereof include a method for adding a solution of alkaline metal hydroxide such as sodium hydroxide and potassium hydroxide, and the like.

In the treatment by the advanced oxidation method, in case of irradiating with ultrasonic waves, the preferable lower limit of the frequency of the ultrasonic waves is 20 kHz, and the preferable upper limit is 1 MHz. Considering that cavitation tends to occur on the low frequency side, the more preferable upper limit is 500 kHz, and the further more preferable upper limit is 100 kHz.

Here, an apparatus for irradiating with ultrasonic waves is not particularly limited, as long as it can irradiate with ultrasonic waves having the above-mentioned frequency.

Moreover, in the treatment by the advanced oxidation method, irradiation with ultraviolet rays to the ozone water is also suitably employed.

In case of employing the irradiation with ultraviolet rays, as the treatment by the advanced oxidation method, the preferable lower limit of the wavelength of ultraviolet rays is 160 nm, and the preferable upper limit is 280 nm. Irradiation with the ultraviolet rays having a wave length within this range allows the advanced oxidation method to be carried out.

Moreover, the ultraviolet rays more preferably include a wavelength of 254 nm. The ultraviolet rays with a wavelength of 254 nm directly work on and decompose an ozone molecule. Since hydroxy radical occurs in this decomposition process, it becomes possible to further enhance the effects of the hydrophilization treatment.

Although an ultraviolet ray lamp to be used upon the irradiation with the ultraviolet rays is not particularly limited, as described above, a lamp capable of irradiating with ultraviolet rays including a wavelength of 254 nm is preferably used, and examples thereof include a low-pressure mercury lamp, a high-pressure mercury lamp, a metal halide lamp and the like.

Intensity and a time period of the irradiation with the ultraviolet rays are not particularly limited, and may be suitably adjusted. However, irradiation with ultraviolet waves having a wavelength of 254 nm with irradiation intensity of 0.5 to 200 mW/cm$^2$ for 1 to 1200 seconds is preferably employed, and irradiation for 60 to 600 seconds is more preferably employed. Irradiation with ultraviolet waves having an excessively small intensity or for an excessively short time period may fail to sufficiently prevent non-specific adsorption of protein and the like due to insufficient hydrophilized surfaces of the filler particles, whereas irradiation of the ultraviolet waves with an excessively great intensity or an excessively long time period may cause a decrease in the strength of the filler particles.

In case of carrying out the treatment by the advanced oxidation method, it is preferably carried out at a temperature of 20° C. or more. The preferable upper limit is 80° C. Under a condition of a temperature of more than 80° C., dissolved ozone gas may be formed into bubbles as it is at a high possibility, sometimes leading to a negative result of reduction in reaction efficiency.

As the above-mentioned filler particle, a particle having been conventionally used as a filler particle for an ion-exchange liquid chromatography method can be used, and examples thereof include an inorganic particle such as silica and zirconia, an organic particle including a natural polymer such as cellulose, polyamino acid and chitosan, and an organic particle including synthetic polymers such as polystyrene and polyacrylic ester. Out of these, the organic particle including the synthetic polymer is preferably used since it shows high resistance to pressure and swelling by adjusting a degree of crosslinking and the like.

The ion exchange group is not particularly limited, and may be a cation exchange group or an anion exchange group. The above-mentioned cation exchange group is not particularly limited, and examples thereof include a carboxyl group, a phosphate group, a sulfonic acid group and the like. The above-mentioned anion exchange group is not particularly limited, and examples thereof include a tertiary amino group, a quaternary amino group and the like. Out of these, the sulfonic acid group is preferably used since the sulfonic acid group enables maintenance of performance over a long period of time and produces high effect on hemoglobin A1c analysis.

The filler particle having the ion exchange group can be prepared by a method for introducing the ion exchange group on the surface of the particle, or a method for forming the particle by polymerizing a monomer mixture containing monomers having the ion exchange group.

A method for introducing the ion exchange group on the surface of the particle is not particularly limited, and a conventionally well-known method can be employed. In case of using the organic particle including the polymer, examples thereof include a method for preparing the particle including the polymer having a functional group and making a chemical reaction of the compound having the ion exchange group with this functional group.

As the method for forming the particle by polymerizing the monomer mixture containing the monomer having the ion exchange group, examples thereof include a method for polymerizing the monomer having the ion exchange group and crosslinking monomer mixed together under existence of a polymerization initiator. In addition, like the method described in Japanese Kokoku Publication No. Hei-8-7197, examples thereof also include a method in which after preparing a crosslinking polymer particle, monomers having the ion exchange group are added and polymerized in parts adjacent to the surface of the polymer particle; a method in which after polymerizing a polymerizable ester compound such as methyl(meth)acrylate and ethyl(meth)acrylate mixed with a crosslinking monomer and the like under existence of a polymerization initiator, hydrolysis treatment of the obtained particle is carried out to convert the ester compound to a cation exchange group, and the like.

Although an average particle diameter of the filler particle having the ion exchange group is not particularly limited, the preferable lower limit is 0.1 μm and the preferable upper limit is 20 μm. The filler with an average particle diameter of less than 0.1 μm may cause insufficient separation due to excessively high pressure in a column, and the filler with an average particle diameter of more than 20 μm may cause insufficient separation due to excessively large dead volume in a column.

With respect to pore size distribution of the filler particles having the ion exchange group, the preferable upper limit of the CV value of the particle diameter is 40%. A filler with particle size distribution of more than 40% may cause insufficient separation due to excessively large dead volume in a column. The more preferable upper limit is 15%.

The lower limit of the concentration of the ozone gas dissolved the ozone water to be used in the present invention is 20 ppm. An ozone water having a concentration of less than 20 ppm fails to sufficiently carry out the hydrophilization treatment and thus fails to sufficiently prevent non-specific adsorption of protein. The preferable lower limit is 50 ppm. The upper limit of the dissolved ozone gas concentration is not particularly limited.

The ozone water with the high concentration can be prepared by a method, as described in Japanese Kokai Publication No. 2001-330969 and the like, for making a contact of ozone gas with material water through an ozone gas permeable membrane that only allows permeation of gas and prevents permeation of liquid, and the like.

In the filler for ion-exchange liquid chromatography produced by the method for production of a filler for ion-exchange liquid chromatography of the present invention, since only the surface portion which makes a direct contact with the ozone water is hydrophilized, no swelling or shrinkage occurs even in an aqueous medium. In addition, no non-specific adsorption of protein and the like occurs, leading to high measurement accuracy. Furthermore, the above-mentioned performance can be maintained over a long period of time, and there are few variations in retention times and measured values even after long-term use. Moreover, there are significantly few variations in retention times or measured values caused by lot-to-lot variation.

The filler for ion-exchange liquid chromatography produced by the method for production of a filler for ion-exchange liquid chromatography of the present invention is also one aspect of the present invention.

The filler for ion-exchange liquid chromatography of the present invention preferably has a contact angle with water of 60° or less.

The contact angle measurement is used as a means of evaluating hydrophilicity or hydrophobicity of a surface of a material such as a polymer material. A material with a smaller contact angle is considered to have higher hydrophilicity.

In the present invention, since it is necessary to sufficiently suppress the non-specific adsorption of a substance to be measured such as protein, the contact angle with water is preferably to be within the above-mentioned range. The contact angle with water is more preferably to be 50° or less.

The filler for ion-exchange liquid chromatography produced by the method for production of a filler for ion-exchange liquid chromatography of the present invention is suitably used in particular in glycosylated hemoglobin analysis.

The filler for ion-exchange liquid chromatography for glycosylated hemoglobin analysis produced by the method for production of a filler for ion-exchange liquid chromatography of the present invention is also one aspect of the present invention.

In addition, the method for measuring glycosylated hemoglobin by using the filler for ion-exchange liquid chromatography for glycosylated hemoglobin analysis of the present invention is also one aspect of the present invention.

Specifically, for example, glycosylated hemoglobin can be measured by filling up a well-known column with the filler for ion-exchange liquid chromatography for glycosylated hemoglobin analysis of the present invention and sending an eluent and a sample to be measured into the obtained column under a predetermined condition.

As the above-mentioned eluent, a conventionally well-known eluent can be used, and examples thereof include a solution containing, as a component, organic acid, inorganic acid or a salt of these, and the like.

FIG. 1 is a graph showing the results of hemoglobin (Hb) recovery ratios based on hemoglobin A1e measurement in Example 3 and Comparative Example 5.

FIG. 2 is a graph showing the results of Hb recovery ratios based on hemoglobin A1e measurement in Example 4, Comparative Example 6, and Comparative Example 7.

FIG. 3 is a graph showing the result of Hb recovery ratios based on hemoglobin A1e measurement in Example 6, Comparative Example 8, and Comparative Example 9.

FIG. 4 is a graph showing the measured value variations in hemoglobin A1e measurement in durability evaluation.

FIG. 5 is a graph showing the result of the hemoglobin (Hb) recovery ratios based on hemoglobin A1e measurement in Example Ii and Comparative Examples 14 to 16.

EFFECTS OF THE INVENTION

According to the present invention, it is possible to provide: a hydrophilic polymer microparticle which shows reduced swelling in an aqueous medium and an excellent dispersibility in an aqueous medium; a filler for ion-exchange liquid chromatography which can effectively suppress non-specific adsorption of protein and the like; a method for analyzing glycosylated hemoglobin by using the filler for ion-exchange liquid chromatography; a method for production of a filler for ion-exchange liquid chromatography that can maintain suppressive effects on swelling; non-specific adsorption and the like for a long period of time; a filler for ion-exchange liquid chromatography produced by the method for production of a filler for ion-exchange liquid chromatography; and a filler for ion-exchange liquid chromatography for glycosylated hemoglobin analysis.

BEST MODE FOR CARRYING OUT THE INVENTION

Hereinafter, the present invention is described in detail with Examples. However, the present invention is not limited only to these Examples.

Example 1

A mixture containing 300 g of tetraethylene glycol dimethacrylate (produced by SHIN-NAKAMURA CHEMICAL CO., LTD.), 100 g of triethylene glycol dimethacrylate (produced by SHIN-NAKAMURA CHEMICAL CO., LTD.), and 1.0 g of benzoyl peroxide (produced by Kishida Chemical Co., Ltd.) was added to 3% polyvinyl alcohol solution (produced by The Nippon Synthetic Chemical Industry Co., Ltd.) in a reaction vessel with a stirrer. The resulting mixture was heated under stirring, and polymerized under nitrogen atmosphere at a temperature of 80° C. for one hour. Polymer microparticles were obtained by washing the obtained polymerized composition with water and acetone.

The average particle diameter and the CV value were measured for the obtained polymer microparticles using a laser diffraction-type particle size distribution measuring apparatus, and gave values of 5 µm and 14%, respectively.

An amount of 10 g of the obtained polymer microparticles were immersed in 300 mL of an ozone water with a dissolved ozone gas concentration of 110 ppm, and under stirring, irradiated with ultraviolet rays for 300 seconds at irradiation intensity of 95 mW/cm$^2$ from 1 cm distance apart using a spot-type UV irradiation device (UP-200G produced by EYE GRAPHICS CO., LTD.) which can irradiate with ultraviolet rays including a wavelength of 254 nm, so as to carry out the hydrophilization treatment. After the irradiation with the ultraviolet rays, centrifugal separation was carried out using a centrifugal separator (Himac CR20G produced by Hitachi, Ltd.) to remove supernatant fluid. These processes were repeated twice to obtain hydrophilic polymer microparticles.

Here, the ozone water was prepared using an ozone water production system (produced by Sekisui Chemical Co., Ltd.) including an ozone dissolution module containing 400 ozone gas permeable membranes, each of which has a shape of a tubular hollow in a size of 0.5 mm×0.04 mm×350 cm in inside diameter, thickness and length, and is made of perfluoroalkoxy resin, in a coat having a round pillar shape and a size of 15 cm×20 cm in inside diameter and length.

Example 2

A mixture containing 300 g of divinylbenzene (produced by Kishida Chemical Co., Ltd.), 100 g of styrene (produced by Wako Pure Chemical Industries, Ltd.) and 1.0 g of benzoyl peroxide (produced by Kishida Chemical Co., Ltd.) was added to 3% solution of polyvinyl alcohol (produced by The Nippon Synthetic Chemical Industry Co., Ltd.) in a reaction vessel with a stirrer. The resulting mixture was heated under stirring, and polymerized under nitrogen atmosphere at a temperature of 80° C. for one hour. Polymer microparticles were obtained by washing the obtained polymerized composition with water and acetone.

The average particle diameter and the CV value were measured for the obtained polymer microparticles using the laser diffraction-type particle size distribution measuring apparatus, and gave values of 5 µm and 13%, respectively.

Hereinafter, hydrophilic polymer microparticles were produced by carrying out the hydrophilization treatment by the ozone water in the same manner as Example 1.

Comparative Example 1

Polymer microparticles were produced in the same manner as Example 1 except that the hydrophilization treatment by the ozone water was not carried out.

Comparative Example 2

Polymer microparticles were produced in the same manner as Example 2 except that the hydrophilization treatment by the ozone water was not carried out.

Comparative Example 3

A mixture containing 100 g of tetraethylene glycol dimethacrylate (produced by SHIN-NAKAMURA CHEMICAL CO., LTD.), 400 g of polyethylene glycol methacrylate (produced by NOF CORPORATION, ethylene glycol chain n=4), and 1.0 g of benzoyl peroxide (produced by Kishida Chemical Co., Ltd.) was added to 3% polyvinyl alcohol solution (produced by The Nippon Synthetic Chemical Industry Co., Ltd.) in a reaction vessel with a stirrer. The resulting mixture was heated under stirring, and polymerized under nitrogen atmosphere at a temperature of 80° C. for one hour. Polymer microparticles were obtained by washing the obtained polymerized composition with water and acetone.

The average particle diameter and the CV value were measured for the obtained polymer microparticles using the laser diffraction-type particle size distribution measuring apparatus, and gave values of 10 µm and 14%, respectively.

<Evaluation>

The following evaluations were carried out for each of the (hydrophilic) polymer microparticles obtained in Examples 1 and 2, and Comparative Examples 1 to 3. Table 1 shows the results.

(1) Measurement of Swelling Ratio

The swelling ratio was measured for each of the (hydrophilic) polymer microparticles obtained in Examples 1 and 2, and Comparative Examples 1 to 3. A particle size distribution analyzer AccuSizer780 (produced by Particle Sizing Systems) was used for the measurement. An amount of 30 mL of pure water or acetone was added to 1 g of the dried (hydrophilic) polymer microparticles, and the obtained mixture was sufficiently stirred and irradiated with ultrasonic waves for 15 minutes to obtain a dispersion. After dispersion, the resulting dispersion was allowed to stand at a temperature of 25° C. for 240 hours to reach equilibrium swelling. Subsequently, the particle diameter $D_W$ in water and the particle diameter $D_A$ in acetone were measured, and $D_W/D_A$ was determined as a swelling ratio.

(2) Measurement of Contact Angle

The contact angle was measured for each of the (hydrophilic) polymer microparticles obtained in Examples 1 and 2, and Comparative Examples 1 to 3. An automatic contact angle meter (Dropmaster500 produced by Kyowa Interface Science Co., Ltd.) was used for the measurement. The dried (hydrophilic) polymer microparticles were placed on a double-stick tape attached to a slide glass having a size of 25 mm×75 mm to form a single layer of the dried (hydrophilic) polymer microparticles without a space therebetween, and then excessive particles were removed by an air spray. Thereby, polymer microparticles were fixed on the double-stick tape. This processes were observed with a microscope.

A droplet of 1 μL of pure water was prepared under a condition of a temperature of 25° C. and placed onto the hydrophilic polymer microparticles fixed on the slide glass, and then the contact angle was calculated based on the θ/2 method. In case of using polymer particles having a contact angle with water of less than 90°, the placed droplet tends to spread. Therefore, the contact angle after the placement of the droplet decreases with a lapse of time. For this reason, the evaluation was carried out using a contact angle value 0.5 seconds after the placement of the droplet.

(3) Evaluation of Dispersibility

Dispersibility was evaluated for each of the (hydrophilic) polymer microparticles obtained in Examples 1 and 2, and Comparative Examples 1 to 3. An evaluation method was as follows. Under a condition of a temperature of 25° C., 30 mL of pure water or acetone was added to 1 g of the dried (hydrophilic) polymer microparticles, and the obtained mixture was sufficiently stirred, irradiated with ultrasonic waves for 15 minutes and allowed to stand for 30 minutes. Subsequently, a small amount of a dispersion stirred lightly was dropped onto the slide glass, and covered with a cover glass to carry out microscopic observation. The evaluation was conducted based on the following standards.

o: No condensed microparticles were seen.

x: Condensed microparticles were seen.

TABLE 1

|  | Swelling ratio | Contact angle with water (°) | Dispersability |
|---|---|---|---|
| Example 1 | 1.2 | 52 | o |
| Example 2 | 1.1 | 55 | o |
| Comparative Example 1 | 1.2 | 98 | x |
| Comparative Example 2 | 1.1 | 110 | x |
| Comparative Example 3 | 3.4 | 68 | o |

In Examples 1 and 2, both of the swelling ratios and the contact angles were small. Therefore, the dispersibilities were excellent owing to a small shape change caused by environmental change in water and high hydrophilicity.

On the other hand, in Comparative Examples 1 and 2, the swelling ratios were small but the contact angles were large. Therefore, the results showed a small shape change caused by environmental change in water but low dispersibility due to the high hydrophobicity.

In Comparative Example 3, the swelling ratio was large and the contact angle was small due to the increased content of the hydrophilic monomers. Therefore, the dispersibility was excellent owing to the high hydrophilicity, while a large shape change occurred due to the environmental change in water.

Example 3

A mixture containing 300 g of tetraethylene glycol dimethacrylate (produced by SHIN-NAKAMURA CHEMICAL CO., LTD.), 100 g of triethylene glycol dimethacrylate (produced by SHIN-NAKAMURA CHEMICAL CO., LTD.), and 1.0 g of benzoyl peroxide (produced by Kishida Chemical Co., Ltd.) was added to 3% polyvinyl alcohol solution (produced by The Nippon Synthetic Chemical Industry Co., Ltd.) in a reaction vessel with a stirrer. The resulting mixture was heated under stirring, and polymerized under nitrogen atmosphere at a temperature of 80° C. for one hour. Next, as the monomer having the ion exchange group, 100 g of 2-methacrylamide-2-methylpropanesulfonic acid (produced by TOAGOSEI CO., LTD.) and 100 g of polyethylene glycol methacrylate (produced by NOF CORPORATION, ethylene glycol chain n=4) were dissolved in an ion-exchanged water. This mixture was added to the same reaction vessel, and similarly polymerized at a temperature of 80° C. under stirring under nitrogen atmosphere for two hours. Coated hydrophilic polymer particles having the ion exchange group (base microparticles having the ion exchange group) were obtained by washing the obtained polymerized composite with water and acetone.

The average particle diameter and the CV value were measured for the obtained coated polymer microparticles using the laser diffraction-type particle size distribution measuring apparatus, and gave values of 8 μm and 14%, respectively.

An amount of 10 g of the obtained coated polymer particles were immersed in 300 mL of an ozone water with a dissolved ozone gas concentration of 100 ppm, and were stirred for 30 minutes. After stirring, centrifugal separation was carried out using the centrifugal separator (Himac CR20G produced by Hitachi, Ltd.), to remove supernatant fluid. This process was repeated twice, and the hydrophilization treatment was carried out to obtain a filler for ion-exchange liquid chromatography.

Here, the ozone water was prepared using the ozone water production system (produced by Sekisui Chemical Co., Ltd.) including an ozone dissolution module containing 400 ozone gas permeable membranes, each of which has a shape of a tubular hollow in a size of 0.5 mm×0.04 mm×350 cm in inside diameter, thickness and length, and is made of perfluoroalkoxy resin, in a coat having a round pillar shape and a size of 15 cm×20 cm in inside diameter and length.

Comparative Example 4

A mixture containing 240 g of ethylene glycol dimethacrylate (produced by SHIN-NAKAMURA CHEMICAL CO., LTD.), 160 g of n-butyl methacrylate (produced by Kyoeisha Chemical Co., Ltd.) and 1.0 g of benzoyl peroxide (produced by Kishida Chemical Co., Ltd.) was added to 3% polyvinyl alcohol solution (produced by The Nippon Synthetic Chemical Industry Co., Ltd.) in a reaction vessel with a stirrer. The resulting mixture was heated under stirring, and polymerized under nitrogen atmosphere at a temperature of 80° C. for one hour. Next, as the monomer having the ion exchange group, 100 g of 2-methacrylamide-2-methylpropanesulfonic acid (produced by TOAGOSEI CO., LTD.), 100 g of polyethylene glycol methacrylate (produced by NOF CORPORATION, ethylene glycol chain n=4) were dissolved in an ion-exchanged water. This mixture was added to the same reaction vessel, and similarly polymerized at a temperature of 80° C. under stirring under nitrogen atmosphere for two hours.

Coated hydrophilic polymer particles with the ion exchange group (base microparticle with the ion exchange group) were obtained by washing the obtained polymerized composite with water and acetone.

The average particle diameter and the CV value were measured for the obtained coated polymer microparticles using the laser diffraction-type particle size distribution measuring apparatus, and gave values of 8 μm and 16%, respectively.

In the same manner as Example 3, 10 g of the obtained coated polymer particles was subjected to the ozone water treatment so as to obtain a filler for ion-exchange liquid chromatography.

Comparative Example 5

Coated polymer particles and a filler for ion-exchange liquid chromatography were obtained in the same manner as Example 3 except that the ozone water treatment was not carried out.

<Evaluation>

The following evaluations were carried out for each of the fillers for ion-exchange liquid chromatography obtained in Example 3 and Comparative Examples 4 and 5. Table 2 and FIG. 1 show the results.

(1) Measurement of Swelling Ratio

The swelling ratio was measured for each of the fillers for ion-exchange liquid chromatography obtained in Example 3 and Comparative Examples 4 and 5. The particle size distribution analyzer AccuSizer780 (produced by Particle Sizing Systems) was used for the measurement. An amount of 30 mL of pure water or acetone was added to 1 g of the dried filler for ion-exchange liquid chromatography, and the obtained mixture was sufficiently stirred and irradiated with ultrasonic waves for 15 minutes to obtain a dispersion. After dispersion, the resulting dispersion was allowed to stand at a temperature of 25° C. for 240 hours to reach equilibrium swelling. Subsequently, the particle diameter $D_W$ in water and the particle diameter $D_A$ in acetone were measured, and $D_W/D_A$ was determined as a swelling ratio.

(2) Measurement of Contact Angle

The contact angle was measured for each of the fillers for ion-exchange liquid chromatography obtained in Example 3, and Comparative Examples 4 and 5. The automatic contact angle meter (Dropmaster500 produced by Kyowa Interface Science Co., Ltd.) was used for the measurement. The dried filler for ion-exchange liquid chromatography was placed on a double-stick tape attached to a slide glass having a size of 25 mm×75 mm to form a single layer of the dried filler for ion-exchange liquid chromatography without a space therebetween, and then excessive particles were removed by an air spray. Thereby, the dried filler for ion-exchange liquid chromatography was fixed on the double-stick tape. This process was observed with a microscope.

A droplet of 1 μL of pure water was prepared under a condition of a temperature of 25° C. and placed onto the dried filler for ion-exchange liquid chromatography fixed on the slide glass, and then the contact angle was calculated based on the θ/2 method. In case of using a filler having a contact angle with water of less than 90°, the placed droplet tends to spread. Therefore, the contact angle after the placement of the droplet decreases with a lapse of time. For this reason, the evaluation was carried out using a contact angle value 0.5 seconds after the placement of the droplet.

(3) Evaluation of Pressure Fluctuation

Columns for a liquid chromatography system were filled with one of the fillers for ion-exchange liquid chromatography produced in Example 3 and Comparative Examples 4 and 5. The eluents each having a different pH value were allowed to pass through the column filled up with the filler for ion-exchange liquid chromatography, and pressure fluctuation in the column upon the eluent passing through the column and a time period (equilibration time) required for stabilization of the column pressure were measured. Specifically, 50 mM of a phosphate buffer (pH 5.7: solution A) was allowed to pass through for 30 minutes. After the column pressure became constant, 300 mM of a phosphate buffer (pH 8.5: solution B) was allowed to pass through, and pressure fluctuation in the column was measured.

(4) Evaluation of Hb Recovery Ratio Based on Hemoglobin A1c Measurement

Columns for a liquid chromatography system were filled with one of the fillers for ion-exchange liquid chromatography produced in Example 3 and Comparative Example 5. At the same time, glyco Hb control level 2 (produced by Sysmex International Reagents Co., Ltd., pro form a amount of 10.4±0.5%) was dissolved in 200 μL of water for injection, and then diluted 100 fold with a diluent (phosphate buffer (pH 7.0) containing 0.1% of Triton X-100) to prepare a sample to be measured.

The amount of hemoglobin A1c and the total amount of hemoglobin A1c and non-glycosylated hemoglobin in the sample to be measured were evaluated based on peak areas of a chromatogram using the obtained columns under the following conditions. A total of 10 samples were successively measured, and average values of the area value of the hemoglobin A1c peak and the sum of the area values of hemoglobin A1c peak and non-glycosylated hemoglobin peak were calculated using the latter five samples and determined as measured values.

FIG. 1 shows a hemoglobin A1c peak area value and a total sum of peak area values of the hemoglobin A1c and the non-glycosylated hemoglobin obtained in Example 3 as 100% to compare peak areas obtained in Example 3 and Comparative Example 5.

System:

Feed Pump LC-9A (produced by Shimadzu Corp.)

Auto sampler ASU-420 (produced by Sekisui Chemical Co., Ltd.)

Detector SPD-6AV (produced by Shimadzu Corp.)

Eluent:

first solution 170 mM of phosphate buffer (pH 5.7)

second solution 300 mM of phosphate buffer (pH 8.5)

Elution method: Elution was carried out with the first solution in a period of 0 to 3 minutes, with the second solution in a period of 3 to 3.2 minutes and with the first solution in a period of 3.2 to 4 minutes.

Flow velocity: 1.0 mL/min

Detection wavelength: 415 nm

Amount of Sample injection: 10 μL

TABLE 2

|  | Swelling ratio | Contact angle (°) | Pressure fluctuation (kg/cm$^2$) | Equilibration time (Sec) | A1cArea recovery ratio (%) | TotalArea recovery ratio (%) |
|---|---|---|---|---|---|---|
| Example 3 | 1.4 | 40 | 2 | 5 | 100 | 100 |
| Comparative Example 4 | 2.8 | 40 | 35 | 660 | — | — |
| Comparative Example 5 | 1.4 | 65 | 2 | 5 | 90 | 85 |

As shown in Table 2, in Example 3, both the swelling ratio and the contact angle were small, resulting in small pressure fluctuation in the column. Furthermore, no non-specific adsorption of a hemoglobin composition was observed.

Moreover, in Example 3, the formed layer of the hydrophilic polymer having the ion exchange group and the hydrophization treatment with the ozone water enabled the surface to have a contact angle with water of 60° or less.

On the other hand, since the filler of Comparative Example 4 had a low degree of crosslinking, the swelling ratio was great, resulting in significantly large pressure fluctuation in the column. Considering its small contact angle, although the non-specific adsorption of hemoglobin was supposed to be suppressed, the evaluation (4) could not be carried out due to excessively large pressure fluctuation in the column. Accordingly, it is very important to set the swelling ratio within a certain range.

Since the filler of Comparative Example 5 had a similar degree of crosslinking to that of Example 3, the swelling ratio was small, resulting in small pressure fluctuation in the column. However, the non-specific adsorption by a hemoglobin composition tended to occur due to its large contact angle. Accordingly, it is very important to set the contact angle within a certain range as well as the degree of swelling.

Example 4

A mixture containing 300 g of tetraethylene glycol dimethacrylate (produced by SHIN-NAKAMURA CHEMICAL CO., LTD.), 100 g of triethylene glycol dimethacrylate (produced by SHIN-NAKAMURA CHEMICAL CO., LTD.) and 1.0 g of benzoyl peroxide (produced by Kishida Chemical Co., Ltd.) was added to 3% polyvinyl alcohol solution (produced by The Nippon Synthetic Chemical Industry Co., Ltd.) in a reaction vessel with a stirrer. The resulting mixture was heated under stirring, and polymerized under nitrogen atmosphere at a temperature of 80° C. for one hour. Next, as the monomer having the ion exchange group, 100 g of 2-methacrylamide-2-methylpropanesulfonic acid (produced by TOAGOSEI CO., LTD.) and 100 g of polyethylene glycol methacrylate (produced by NOF CORPORATION, ethylene glycol chain n=4) were dissolved in an ion-exchanged water. This mixture was added to the same reaction vessel, and similarly polymerized at a temperature of 80° C. under stirring under nitrogen atmosphere for two hours. Coated hydrophilic polymer particles having the ion exchange group were obtained by washing the obtained polymerized composition with water and acetone.

The average particle diameter and the CV value were measured for the obtained coated polymer particles using the laser diffraction-type particle size distribution measuring apparatus, and gave values of 8 μm and 14%, respectively.

An amount of 10 g of the obtained coated polymer particles were immersed in 300 mL of an ozone water with a dissolved ozone gas concentration of 100 ppm, and were stirred for 30 minutes.

After stirring, centrifugal separation was carried out using the centrifugal separator (Himac CR20G produced by Hitachi, Ltd.) to remove supernatant fluid. This process was repeated twice, and the hydrophilization treatment was carried out to obtain a filler for ion-exchange liquid chromatography.

Here, the ozone water was prepared using the ozone water production system (produced by Sekisui Chemical Co., Ltd.) including an ozone dissolution module containing 400 ozone gas permeable membranes, each of which has a shape of a tubular hollow in a size of 0.5 mm×0.04 mm×350 cm in inside diameter, thickness and length, and is made of perfluoroalkoxy resin in a coat having a round pillar shape and a size of 15 cm×20 cm, in inside diameter and length.

Example 5

Coated polymer particles and a filler for ion-exchange liquid chromatography were obtained in the same manner as that of Example 4 except that methoxypolyethylene glycol methacrylate (produced by NOF CORPORATION, ethylene glycol chain n=4) was used in place of polyethylene glycol methacrylate.

Comparative Example 6

Coated polymer particles and a filler for ion-exchange liquid chromatography were obtained in the same manner as that of Example 4 except that the ozone water treatment was not carried out.

Comparative Example 7

Instead of the ozone water treatment, coating treatment using protein was performed on coated polymer particles obtained in the same manner as that of Example 4. An amount of 200 ml of 0.2% BSA (bovine serum albumin) dissolved in phosphate buffer (pH 5.7) was added to 10 g of the filler particles, and the obtained solution was subjected to ultrasonic treatment for two minutes, stirred gently in a constant-temperature bath at a temperature of 60° C. for 24 hours, and then taken out from the constant-temperature bath and allowed to stand until the temperature of the resulting solution became a room temperature. Subsequently, after removal of supernatant fluid by centrifugal separation, 200 ml of the phosphate buffer (pH 8.5) was added, and supernatant fluid was removed by centrifugal separation again. Thereafter, 200 ml of the phosphate buffer (pH 5.7) was added, and supernatant fluid was removed by third-time centrifugal separation to obtain a filler for ion-exchange liquid chromatography with a protein coating by physical adsorption.

<Evaluation>

The following evaluations were carried out for each of the fillers for ion-exchange liquid chromatography obtained in Examples 4 and 5 and Comparative Examples 6 and 7.

(1) Measurement of Contact Angle

The contact angle was measured for each of the coated polymer particles obtained in Examples 4 and 5 and Comparative Examples 6 and 7. An automatic contact angle meter (Dropmaster500 produced by Kyowa Interface Science Co., Ltd.) was used for the measurement. The dried coated polymer particles were evenly placed on a double-stick tape attached to a slide glass, and then excessive particles were removed by an air spray. Thereby, one layer of the coated polymer microparticles was fixed to the double-stick tape. These processes were observed by a microscope.

A droplet of 1 μL of an ion-exchanged water was prepared and placed onto the coated polymer particles fixed on the slide glass, and the contact angle was calculated based on the θ/2 method. In case of using coated polymer particles having a contact angle with water of less than 90°, the droplet placed tends to spread. Therefore, the contact angle after the placement of the droplet decreases with the lapse of time. For this reason, the evaluation was carried out using a contact angle value 0.5 seconds after the placement of the droplet.

Table 3 shows the results.

(2) Evaluation of Hb Recovery Ratio Based on Hemoglobin A1c Measurement

Columns for a liquid chromatography system were filled with one of the fillers for ion-exchange liquid chromatography produced in Example 4 and Comparative Examples 6 and 7. At the same time, glyco Hb control level 2 (produced by Sysmex International Reagents Co., Ltd., pro form a amount of 10.4±0.5%) was dissolved in 200 μL of water for injection, and then diluted 100 fold with a diluent (phosphate buffer (pH 7.0) containing 0.1% of Triton X-100) to prepare a sample to be measured.

The amount of hemoglobin A1c and the total amount of hemoglobin A1c and non-glycosylated hemoglobin in the sample to be measured were evaluated based on peak areas of a chromatogram using the obtained column under the following conditions. A total of 10 samples were successively measured, and average values of the area value of the hemoglobin A1c peak and the sum of the area values of hemoglobin A1c peak and non-glycosylated hemoglobin peak were calculated using the latter five samples and determined as measured values.

Table 4 and FIG. 2 show the results. FIG. 2 shows a hemoglobin A1c peak area value and a total sum of the peak area values of the hemoglobin A1c and the non-glycosylated obtained in Example 4 as 100% to compare the peak areas obtained in Example 4 and Comparative Examples 6 and 7.

System:

Feed Pump LC-9A (produced by Shimadzu Corp.)

Auto sampler ASU-420 (produced by Sekisui Chemical Co., Ltd.)

Detector SPD-6AV (produced by Shimadzu Corp.)

Eluent:

first solution 170 mM of phosphate buffer (pH 5.7)

second solution 300 mM of phosphate buffer (pH 8.5)

Elution method: Elution was carried out with the first solution in a period of 0 to 3 minutes, with the second solution in a period of 3 to 3.2 minutes and with the first solution in a period of 3.2 to 4 minutes.

Flow velocity: 1.0 mL/min

Detection wavelength: 415 nm

Sample injection amount: 10 μL (3) Evaluation of Variation in Measured Values in Hemoglobin A1c Measurement (Durability Evaluation)

Columns for a liquid chromatography system were filled with one of the fillers for ion-exchange liquid chromatography produced in Example 4 and Comparative Examples 6 and 7. At the same time, glyco Hb control level 2 (produced by Sysmex International Reagents Co., Ltd., pro form a amount of 10.4±0.5%) was dissolved in 200 μL of an water for injection, and then diluted 100 fold with a diluent (phosphate buffer (pH 7.0) containing 0.1% of Triton X-100) to prepare a sample to be measured. Moreover, a blood sample was collected from a healthy human using NaF, hemolysed with a hemolysing agent (phosphate buffer (pH 7.0) containing 0.1% by weight of Triton X-100), and then diluted 150 fold to prepare a load sample.

A total of about 1000 samples of the sample to be measured and the load samples were measured, 10 samples to be measured were continuously measured at arbitrary intervals, and average values thereof were used for the evaluation. Under the following conditions, the amounts of hemoglobin A1c and non-glycosylated hemoglobin in the samples to be measured were measured to determine a proportion (hemoglobin A1c value (%)) of hemoglobin A1c to a sum of hemoglobin A1c and non-glycosylated hemoglobin. Moreover, the retention time of hemoglobin A1c was also measured.

Table 5 shows the results.

System:

Feed Pump LC-9A (produced by Shimadzu Corp.)

Auto sampler ASU-420 (produced by Sekisui Chemical Co., Ltd.)

Detector SPD-6AV (produced by Shimadzu Corp.)

Eluent:

first solution 170 mM of phosphate buffer (pH 5.7)

second solution 300 mM of phosphate buffer (pH 8.5)

Elution method: Elution was carried out with the first solution in a period of 0 to 3 minutes, with the second solution in a period of 3 to 3.2 minutes and with the first solution in a period of 3.2 to 4 minutes.

Flow velocity: 1.0 mL/min

Detection wavelength: 415 nm

Sample injection amount: 10 μL

TABLE 3

|  | Contact angle |
|---|---|
| Example 4 | 40° |
| Example 5 | 47° |
| Comparative Example 6 | 65° |
| Comparative Example 7 | 35° |

TABLE 4

|  | A1cArea | TotalArea |
|---|---|---|
| Example 4 | 100% | 100% |
| Comparative Example 6 | 90% | 85% |
| Comparative Example 7 | 100% | 100% |

TABLE 5

| Number of load samples | Example 4 | | Comparative Example 6 | | Comparative Example 7 | |
|---|---|---|---|---|---|---|
| | Retention time (Sec) | Hemoglobin A1c value (%) | Retention time (Sec) | Hemoglobin A1c value (%) | Retention time (Sec) | Hemoglobin A1c value (%) |
| 50 | 119.1 | 10.5 | 119.1 | 9.9 | 120.0 | 10.4 |
| 100 | 118.8 | 10.5 | 118.4 | 10.0 | 119.4 | 10.6 |
| 150 | 118.6 | 10.6 | 118.1 | 10.1 | 119.1 | 10.5 |
| 200 | 118.6 | 10.5 | 117.8 | 10.2 | 118.8 | 10.3 |
| 250 | 118.5 | 10.5 | 117.6 | 10.3 | 119.4 | 10.5 |
| 300 | 118.6 | 10.5 | 117.4 | 10.4 | 119.9 | 10.6 |
| 400 | 118.6 | 10.5 | 117.3 | 10.4 | 120.6 | 10.5 |
| 500 | 118.5 | 10.5 | 117.3 | 10.5 | 121.1 | 10.4 |
| 600 | 118.6 | 10.5 | 117.3 | 10.4 | 121.5 | 10.5 |
| 700 | 118.5 | 10.5 | 117.3 | 10.5 | 121.9 | 10.6 |
| 800 | 118.5 | 10.6 | 117.2 | 10.5 | 122.2 | 10.4 |
| 900 | 118.5 | 10.5 | 117.3 | 10.4 | 122.5 | 10.5 |
| 1000 | 118.5 | 10.5 | 117.3 | 10.5 | 122.8 | 10.5 |
| Average | 118.6 | 10.5 | 117.6 | 10.3 | 120.7 | 10.5 |
| Standard deviation | 0.17 | 0.04 | 0.57 | 0.20 | 1.38 | 0.09 |
| Variation coefficient | 0.1 | 0.4 | 0.5 | 2.0 | 1.1 | 0.9 |

As shown in Table 3, in Examples 4 and 5, the formed layers of the hydrophilic polymer having the ion exchange group and the hydrophization treatment with the ozone water enabled the surfaces to have a contact angle with water of 60° or less. Also in Comparative Example 7, coating by protein, which is a hydrophilic compound, enabled the surface to have a contact angle with water of 60° or less. In Comparative Example 6, the contact angle was significantly larger than that of Example 4.

FIG. 2 shows that the filler of Comparative Example 6 with a large contact angle than that of Example 4 had reduction in the hemoglobin A1c peak area value and the sum of area values of the hemoglobin A1c peak and the non-glycosylated hemoglobin peak. Moreover, the filler of Comparative Example 7 with a small contact angle had the same level of the hemoglobin A1c peak area value and the sum of area values of the hemoglobin A1c peak and the non-glycosylated hemoglobin peak as those in Example 4. That is, the results show that in a filler having a contact angle with water of 60° or more, hemoglobin A1c or another hemoglobin composition adsorbed on the filler particle surface.

As shown in Table 4, in case of using the filler for ion-exchange liquid chromatography produced in Example 4, during the measurement of 1000 samples, there were significantly small variations in the hemoglobin A1c values (%) and the retention times, so that accurate measurement could be achieved. On the other hand, in Comparative Example 6, variation in the hemoglobin A1c values was great. Non-specific adsorption by hemoglobin A1c or another hemoglobin composition is considered to cause the variations. Moreover, in Comparative Example 7, the retention times were varied. Detachment of the protein coating for improving hydrophilicity during the measurement is considered to cause the variation.

Example 6

A mixture containing 300 g of tetraethylene glycol dimethacrylate (produced by SHIN-NAKAMURA CHEMICAL CO., LTD.), 100 g of triethylene glycol dimethacrylate (produced by SHIN-NAKAMURA CHEMICAL CO., LTD.), 1.0 g of benzoyl peroxide (Kishida Chemical Co., Ltd. produced by) was added to 3% polyvinyl alcohol solution (produced by The Nippon Synthetic Chemical Industry Co., Ltd.) in a reaction vessel with a stirrer. The resulting mixture was heated under stirring, and polymerized under nitrogen atmosphere at a temperature of 80° C. for one hour. Next, as the monomer having the ion exchange group, 100 g of 2-methacrylamide-2-methylpropanesulfonic acid (produced by TOAGOSEI CO., LTD.) and 100 g of polyethylene glycol methacrylate (produced by NOF CORPORATION, ethylene glycol chain n=4) were dissolved in an ion-exchanged water. This mixture was added to the same reaction vessel, and similarly polymerized at a temperature of 80° C. under stirring under nitrogen atmosphere for two hours. Coated hydrophilic polymer particles having the ion exchange group were obtained by washing the obtained polymerized composition with water and acetone.

The average particle diameter and the CV value were measured for the obtained coated polymer particles using the laser diffraction-type particle size distribution measuring apparatus, and gave values of 8 μm and 14%, respectively.

An amount of 10 g of the obtained coated polymer particles were immersed in 300 mL of an ozone water with a dissolved ozone gas concentration of 100 ppm, and were stirred for 30 minutes. After stirring, centrifugal separation was carried out using the centrifugal separator (Himac CR20G produced by Hitachi, Ltd.) to remove supernatant fluid. This process was repeated twice, and the hydrophilization treatment was carried out to obtain a filler for ion-exchange liquid chromatography.

Here, the ozone water was prepared using the ozone water production system (produced by Sekisui Chemical Co., Ltd.) including an ozone dissolution module containing 400 ozone gas permeable membranes, each of which has a shape of a tubular hollow in a size of 0.5 mm×0.04 mm×350 cm in inside diameter, thickness and length, and is made of perfluoroalkoxy resin in a coat having a round pillar shape and a size of 15 cm×20 cm, in inside diameter and length.

Example 7

Coated polymer particles and a filler for ion-exchange liquid chromatography were obtained in the same manner as that of Example 6 except that methoxypolyethylene glycol methacrylate (produced by NOF CORPORATION, ethylene glycol chain n=4) was used in place of polyethylene glycol methacrylate.

Example 8

Coated polymer particles and a filler for ion-exchange liquid chromatography were obtained in the same manner as that of Example 6 except that glycerol methacrylate (produced by NOF CORPORATION) was used in place of polyethylene glycol methacrylate.

Example 9

Coated polymer particles and a filler for ion-exchange liquid chromatography were obtained in the same manner as that of Example 6 except that polyethylene glycol methacrylate was not added.

Comparative Example 8

Coated polymer particles and a filler for ion-exchange liquid chromatography were obtained in the same manner as that of Example 6 except that the ozone water treatment was not carried out.

Comparative Example 9

Coated polymer particles and a filler for ion-exchange liquid chromatography were obtained in the same manner as that of Example 6 except that oxidation treatment with a hydrogen peroxide solution was carried out in place of the ozone water treatment. Hereinafter, the oxidation treatment method using the hydrogen peroxide solution is described.

An amount of 10 g of the coated polymer particles were immersed in 300 mL of 1% hydrogen peroxide solution, and were stirred for 30 minutes. Here, 1% hydrogen peroxide solution was prepared using 30% hydrogen peroxide solution (produced by Wako Pure Chemical Industries, Ltd.). After stirring, centrifugal separation was carried out using the centrifugal separator (Himac CR20G produced by Hitachi, Ltd.) to remove supernatant fluid. This process was repeated twice to obtain a filler for ion-exchange liquid chromatography.

<Evaluation>

The following evaluations were carried out for each of the fillers for ion-exchange liquid chromatography obtained in Examples 6 to 9 and Comparative Examples 8 and 9.

(4) Measurement of Thickness of Layer of Hydrophilic Polymers

A thickness of a layer of hydrophilic polymers was measured for each of the coated hydrophilic polymer particles having the ion exchange group obtained in Examples 6 to 9 and Comparative Examples 8 and 9 according to "a method for measuring average thickness of coating layer" disclosed in Japanese Kokoku Publication No. Hei-8-7197. The results showed that the thickness of the coating layer of each of the obtained coated polymer particles was within a range of 5 to 10 nm, and thereby revealed that all the results were within a range of 1 to 30 nm that is considered as a preferable range.

(5) Measurement of Contact Angle

The contact angle was measured for each of the coated polymer particles in Examples 6 to 9 and Comparative Examples 8 and 9. An automatic contact angle meter (Dropmaster500 produced by Kyowa Interface Science Co., Ltd.) was used for the measurement. The dried coated polymer particles were placed on a double-stick tape attached to a slide glass to form a single layer without a space therebetween, and then excessive particles are removed by an air spray. Thereby, one layer of the coated polymer particles was fixed on the double-stick tape. These processes were observed by a microscope.

A droplet of 1 µL of pure water was prepared and placed onto the coated polymer particles fixed on the slide glass, and the contact angle was calculated based on the θ/2 method. In case of using coated polymer particles having a contact angle with water of less than 90°, the droplet placed tends to spread. Therefore, the contact angle after the placement of the droplet decreases with the lapse of time. For this reason, the evaluation was carried out using a contact angle value 0.5 seconds after from the placement of the droplet.

Table 6 shows the results.

(6) Evaluation of Hb Recovery Ratio Based on Hemoglobin A1c Measurement

Columns for a liquid chromatography system were filled with one of the fillers for ion-exchange liquid chromatography produced in Example 6 and Comparative Examples 8 and 9. At the same time, glyco Hb control level 2 (produced by Sysmex International Reagents Co., Ltd., pro form a amount of 10.4±0.5%) was dissolved in 200 µL of water for injection, and then diluted 100 fold with a diluent (phosphate buffer (pH 7.0) containing 0.1% of Triton X-100) to prepare a sample to be measured.

The amount of hemoglobin A1c and the total amount of hemoglobin A1c and non-glycosylated hemoglobin in the sample to be measured were evaluated based on peak areas of a chromatogram using the obtained column under the following conditions. A total of 10 samples were successively measured, and average values of the area value of the hemoglobin A1c peak and the sum of the area values of hemoglobin A1c peak and non-glycosylated hemoglobin peak were calculated using the latter five samples and determined as measured values.

Table 7 and FIG. 3 show the results. FIG. 3 shows a hemoglobin A1c peak area value and a total sum of peak area values of the hemoglobin A1c and the non-glycosylated hemoglobin obtained in Example 6 as 100% to compare peak areas obtained in Example 6 and Comparative Examples 8 and 9.

System:
Feed Pump LC-9A (produced by Shimadzu Corp.)
Auto sampler ASU-420 (produced by Sekisui Chemical Co., Ltd.)
Detector SPD-6AV (produced by Shimadzu Corp.)
Eluent:
first solution 170 mM of phosphate buffer (pH 5.7)
second solution 300 mM of phosphate buffer (pH 8.5)
Elution method: Elution was carried out with the first solution in a period of 0 to 3 minutes, with the second solution in a period of 3 to 3.2 minutes and with the first solution in a period of 3.2 to 4 minutes.
Flow velocity: 1.0 mL/min
Detection wavelength: 415 nm
Sample injection amount: 10 µL (7) Evaluation of Variation in Measured Values in Hemoglobin A1c Measurement (Durability Evaluation)

Columns for a liquid chromatography system were filled with one of the fillers for ion-exchange liquid chromatography produced in Example 6 and Comparative Examples 8 and 9. At the same time, glyco Hb control level 2 (produced by Sysmex International Reagents Co., Ltd., pro form a amount of 10.4±0.5%) was dissolved in 200 µL of water for injection, and then diluted 100 fold with a diluent (phosphate buffer (pH 7.0) containing 0.1% of Triton X-100) to prepare a sample to be measured. Moreover, a blood sample was collected from a healthy human using NaF, hemolysed with a hemolysing agent (phosphate buffer (pH 7.0) containing 0.1% by weight of Triton X-100), and then diluted 150 fold to prepare a load sample.

A total of about 1000 samples of sample to be measured and load samples were measured, 10 samples to be measured were continuously measured at arbitrary intervals, and average values thereof were used for the evaluation. Under the following conditions, the amounts of hemoglobin A1c and non-glycosylated hemoglobin in samples to be measured were measured, and a proportion of hemoglobin A1c to a sum of hemoglobin A1c and non-glycosylated hemoglobin was determined.

Table 8 and FIG. 4 show the results.
System:
Feed Pump LC-9A (produced by Shimadzu Corp.)
Auto sampler ASU-420 (produced by Sekisui Chemical Co., Ltd.)
Detector SPD-6AV (produced by Shimadzu Corp.)
Eluent:
first solution 170 mM of phosphate buffer (pH 5.7)
second solution 300 mM of phosphate buffer (pH 8.5)
Elution method: Elution was carried out with the first solution in a period of 0 to 3 minutes, with the second solution in a period of 3 to 3.2 minutes and with the first solution in a period of 3.2 to 4 minutes.
Flow velocity: 1.0 mL/min
Detection wavelength: 415 nm
Sample injection amount: 10 μL

TABLE 6

|  | Contact angle |
| --- | --- |
| Example 6 | 40° |
| Example 7 | 47° |
| Example 8 | 35° |
| Example 9 | 58° |
| Comparative Example 8 | 65° |
| Comparative Example 9 | 64° |

TABLE 7

|  | A1cArea | TotalArea |
| --- | --- | --- |
| Example 6 | 100% | 100% |
| Comparative Example 8 | 90% | 85% |
| Comparative Example 9 | 91% | 85% |

TABLE 8

| Number of samples | Example 6 | Comparative Example 8 | Comparative Example 9 |
| --- | --- | --- | --- |
| 50 | 10.5% | 9.9% | 9.9% |
| 100 | 10.5% | 10.0% | 10.0% |
| 150 | 10.6% | 10.1% | 10.2% |
| 200 | 10.5% | 10.2% | 10.3% |
| 250 | 10.5% | 10.3% | 10.4% |
| 300 | 10.5% | 10.4% | 10.4% |
| 400 | 10.5% | 10.4% | 10.5% |
| 500 | 10.5% | 10.5% | 10.4% |
| 600 | 10.5% | 10.4% | 10.5% |
| 700 | 10.5% | 10.5% | 10.5% |
| 800 | 10.6% | 10.5% | 10.5% |
| 900 | 10.5% | 10.4% | 10.5% |
| 1000 | 10.5% | 10.5% | 10.5% |

As shown in Table 6, in Examples 6 to 9, the formed layer of the hydrophilic polymer having the ion exchange group and the hydrophization treatment with the ozone water enabled the surface to have the contact angle with water of 60° or less. In Example 6, the large exposure of the hydrophobic polymer due to no addition of the hydrophilic monomer without the ion exchange group is considered to induce a slightly large contact angle. In Comparative Examples 8 and 9, the contact angles were apparently larger than that of Example 6. The results of Comparative Example 9 proved that the oxidation treatment method using the hydrogen peroxide solution is inadequate.

As shown in Table 7 and FIG. 3, in Comparative Examples 8 and 9, a hemoglobin A1c peak area value and a sum of area values of the hemoglobin A1c peak and the non-glycosylated hemoglobin peak decreased, as compared with Example 6. That is, the results indicate that hemoglobin A1c or another hemoglobin composition adsorbed on the surface of the filler particle surface.

As shown in Table 8 and FIG. 4, in case of using the filler for ion-exchange liquid chromatography produced in Example 6, during measurement of 1000 samples, there were significantly small variations in the hemoglobin A1c values (%), and accurate measurement could be achieved. On the other hand, in case of using the fillers for ion-exchange liquid chromatography produced in Comparative Examples 8 and 9, the hemoglobin A1c values (%) were significantly varied during the measurement of first 300 samples. Non-specific adsorption of hemoglobin A1c or another hemoglobin composition seen in the evaluation (6) is considered to cause the variation.

Example 10

(1) Preparation of Filler Particles Having Ion Exchange Group

An amount of 200 g of 2-acrylamide-2-methylpropane sulfonic acid, 400 g of diethylene glycol dimethacrylate, 80 g of 2-hydroxy-1,3-dimethacryoxy propane and 1.5 g of benzoyl peroxide are mixed, and dispersed in 2.5 L of 4% by weight polyvinyl alcohol solution. The temperature of the obtained mixture was raised under stirring under nitrogen atmosphere. After polymerized at a temperature of 80° C. for eight hours, the mixture was washed and classified to obtain filler particles having a sulfonic acid group.

The average particle diameter and the CV value were measured for the obtained filler particles using a laser diffraction-type particle size distribution measuring apparatus, and gave values of 8 μm and 14%, respectively.

(2) Hydrophilization Treatment by Ozone Water

An amount of 10 g of the obtained filler particles were immersed in 300 mL of an ozone water with a dissolved ozone gas concentration of 150 ppm, and the obtained mixture was adjusted to have pH of 11.0 by addition of drops of 1 N NaOH (produced by Wako Pure Chemical Industries, Ltd.) under stirring. After pH adjustment, the mixture was immediately subjected to irradiation with ultrasonic waves having frequency of 28 kHz for 30 minutes in a ultrasonic irradiation device (USD-2 produced by AS ONE Corporation) with a tank having a temperature set to 50° C.

After the irradiation with the ultrasonic waves, centrifugal separation was carried out using the centrifugal separator (Himac CR20G produced by Hitachi, Ltd.) to remove supernatant fluid. This process was repeated twice, and the hydrophilization treatment was carried out to obtain a filler for ion-exchange liquid chromatography.

Here, the ozone water was prepared using the ozone water production system (produced by Sekisui Chemical Co., Ltd.) including an ozone dissolution module containing 400 ozone gas permeable membranes, each of which has a shape of a tubular hollow in a size of 0.5 mm×0.04 mm×350 cm in inside diameter, thickness and length, and is made of perfluoroalkoxy resin in a coat having a round pillar shape and a size of 15 cm×20 cm, in inside diameter and length.

Comparative Example 10

A filler particles having the sulfonic acid group prepared in Example 10 were used as the filler for ion-exchange liquid chromatography as they are, without carrying out the hydrophilization treatment by ozone water.

Comparative Example 11

A filler for ion-exchange liquid chromatography was obtained by the hydrophilization treatment in the same manner as that of Example 10 except that an ozone water with a dissolved ozone gas concentration of 10 ppm was used in the hydrophilization treatment by the ozone water.

Comparative Example 12

A filler for ion-exchange liquid chromatography was obtained by the hydrophilization treatment in the same manner as that of Example 10 except that pH adjustment and irradiation with ultrasonic waves were not carried out in the hydrophilization treatment by the ozone water.

Comparative Example 13

An amount of 200 mL of 0.2% by weight of bovine serum albumin (BSA) dissolved in the phosphate buffer (pH 5.7) was added to 10 g of the filler particles having a sulfonic acid group prepared in Example 10, the obtained solution was subjected to ultrasonic treatment for two minutes, stirred gently in a constant-temperature bath at a temperature of 80° C. for 24 hours, and then taken out from the constant-temperature bath and allowed to stand until the temperature of the resulting solution became a room temperature. Subsequently, after removal of supernatant fluid by centrifugal separation, 200 mL of the phosphate buffer (pH 8.5) were added, and supernatant fluid was removed by centrifugal separation again. Thereafter, 200 mL of the phosphate buffer (pH 5.7) was added, and supernatant fluid was removed by third-time centrifugal separation to obtain a filler for ion-exchange liquid chromatography coated with BSA fixed thereon by physical adsorption.

<Evaluation>

The following evaluations were carried out for each of the fillers for ion-exchange liquid chromatography obtained in Example 10 and Comparative Examples 10 to 13.

(1) Evaluation of Initial Measured Value in Hemoglobin A1c Measurement

Columns for a liquid chromatography system were filled with one of the fillers for ion-exchange liquid chromatography produced in Example 10 and Comparative Examples 10 to 12. At the same time, glyco Hb control level 2 (produced by Sysmex International Reagents Co., Ltd., pro form a amount of 10.4±0.5%) was dissolved in 200 μL of water for injection, and then diluted 100 fold with a diluent (phosphate buffer (pH 7.0) containing 0.1% of Triton X-100) to prepare a sample to be measured.

Under the following conditions, the amounts of hemoglobin A1c and non-glycosylated hemoglobin in samples to be measured were measured using the obtained columns, and a proportion of hemoglobin A1c to a sum of hemoglobin A1c and non-glycosylated hemoglobin was determined. A total of 10 samples were successively measured, and a measured value was obtained as an average value determined by the latter five samples.

Table 9 shows the results.

System:

Feed Pump LC-9A (produced by Shimadzu Corp.)

Auto sampler ASU-420 (produced by Sekisui Chemical Co., Ltd.)

Detector SPD-6AV (produced by Shimadzu Corp.)

Eluent:

first solution 170 mM of phosphate buffer (pH 5.7)

second solution 300 mM of phosphate buffer (pH 8.5)

Elution method: Elution was carried out with the first solution in a period of 0 to 3 minutes, with the second solution in a period of 3 to 3.2 minutes and with the first solution in a period of 3.2 to 4 minutes.

Flow velocity: 1.0 mL/min

Detection wavelength: 415 nm

Sample injection amount: 10 μL

TABLE 9

| | Example 10 | Comparative Example 10 | Comparative Example 11 | Comparative Example 12 |
|---|---|---|---|---|
| Hemoglobin A1c value (%) | 10.5 | 2.1 | 6.7 | 10.3 |

As shown in Table 9, in case of using the filler for ion-exchange liquid chromatography produced in Example 10, highly accurate measurement could be achieved. On the contrary, in case of using the filler for ion-exchange liquid chromatography produced in Comparative Example 10, the hemoglobin A1c value (%) considerably lower than an expected value was obtained. This is because, in particular, the remarkably reduced proportion of hemoglobin A1c was seen when the filler for ion-exchange liquid chromatography produced in Comparative Example 10 was used. That is, the results indicate non-specific adsorption of a hemoglobin component on the filler particle surface. In case of using the filler for ion-exchange liquid chromatography produced in Comparative Example 11, although better than Comparative Example 10, the hemoglobin A1c value (%) lower than an expected value was obtained. That is, the results indicate that the dissolved ozone gas concentration of 10 ppm failed to produce sufficient hydrophilization effects. In case of using the filler for ion-exchange liquid chromatography produced in Comparative Example 12, the hemoglobin A1c value (%) similar to that of Example 10 was obtained. However, compared with Example 10, approximate 10% reductions were seen in both of the amount of hemoglobin A1c for calculating the hemoglobin A1c value (%), and the amount of non-glycosylated hemoglobin. Accordingly, the results indicate that, although Example 10 and Comparative Example 12 had the almost identical hemoglobin A1c values (%), non-specific adsorption of a hemoglobin composition occurred in Comparative Example 12.

(2) Evaluation of Variation in Measured Values in Hemoglobin A1c Measurement (Durability Evaluation)

Columns for a liquid chromatography system were filled with one of the fillers for ion-exchange liquid chromatography produced in Example 10 and Comparative Example 13. At the same time, glyco Hb control level 2 (produced by Sysmex International Reagents Co., Ltd., pro form a amount of 10.4±0.5%) was dissolved in 200 μL of water for injection, and then diluted 100 fold with a diluent (phosphate buffer (pH 7.0) containing 0.1% of Triton X-100) to prepare a sample to be measured. Moreover, 300 samples were measured on each day as load samples that were obtained by carrying out, on a blood sample collected from a healthy human using NaF, hemolysation with a hemolysing agent (phosphate buffer (pH 7.0) containing 0.1% by weight of Triton X-100), and 150 fold dilution.

Under the following conditions, the amounts of hemoglobin A1c and non-glycosylated hemoglobin in samples to be measured were measured using the column used for the measurement of the load samples, and a proportion of hemoglobin A1c (hemoglobins A1c value (%)) to a sum of hemoglobin A1c and non-glycosylated hemoglobin was determined. A total of 10 samples were successively measured, and a measured value was obtained as an average value. Moreover, the retention time of hemoglobin A1c was also measured.

Table 10 shows the results.

System:
Feed Pump LC-9A (produced by Shimadzu Corp.)
Auto sampler ASU-420 (produced by Sekisui Chemical Co., Ltd.)
Detector SPD-6AV (produced by Shimadzu Corp.)
Eluent:
first solution 170 mM of phosphate buffer (pH 5.7)
second solution 300 mM of phosphate buffer (pH 8.5)
Elution method: Elution was carried out with the first solution in a period of 0 to 3 minutes, with the second solution in a period of 3 to 3.2 minutes and with the first solution in a period of 3.2 to 4 minutes.
Flow velocity: 1.0 mL/min
Detection wavelength: 415 nm
Sample injection amount: 10 μL

TABLE 10

| Number of load sample | Example 10 | | Comparative Example 13 | |
|---|---|---|---|---|
| | Retention time (sec) | Hemoglobin A1c value (%) | Retention time (sec) | Hemoglobin A1c value (%) |
| 0 | 119 | 10.5 | 121 | 10.6 |
| 300 | 119 | 10.5 | 120 | 10.3 |
| 600 | 118 | 10.5 | 120 | 10.4 |
| 900 | 118 | 10.5 | 119 | 10.3 |
| 1200 | 118 | 10.4 | 120 | 10.5 |
| 1500 | 118 | 10.5 | 120 | 10.5 |
| 1800 | 118 | 10.4 | 121 | 10.6 |
| 2100 | 118 | 10.5 | 122 | 10.5 |
| 2400 | 118 | 10.5 | 122 | 10.7 |
| 2700 | 118 | 10.5 | 122 | 10.3 |
| 3000 | 118 | 10.4 | 123 | 10.4 |
| 3300 | 118 | 10.5 | 123 | 10.6 |
| 3600 | 118 | 10.5 | 124 | 10.3 |
| 3900 | 118 | 10.4 | 124 | 10.5 |
| 4200 | 118 | 10.5 | 125 | 10.6 |
| 4500 | 118 | 10.5 | 126 | 10.7 |
| Average | 118.1 | 10.48 | 122.0 | 10.49 |
| Standard deviation | 0.34 | 0.04 | 2.03 | 0.14 |

As shown in Table 10, in case of using the filler for ion-exchange liquid chromatography produced in Example 10, it is possible to obtain accurate hemoglobin A1c values (%) almost without variation in the retention times of hemoglobin A1c, even after the load test of 4500 samples was conducted. On the contrary, in case of using the filler for ion-exchange liquid chromatography produced in Comparative Example 13, the retention times of hemoglobin A1c tended to vary as the number of load samples increased, and also the obtained hemoglobin A1c values (%) showed wider variation than that of Example 10.

Example 11

(1) Preparation of Filler Particles Having Ion Exchange Group

A mixture containing 300 g of tetraethylene glycol dimethacrylate (produced by SHIN-NAKAMURA CHEMICAL CO., LTD.), 100 g of triethylene glycol dimethacrylate (produced by SHIN-NAKAMURA CHEMICAL CO., LTD.), and 1.0 g of benzoyl peroxide (produced by Kishida Chemical Co., Ltd.) was added to 3% of polyvinyl alcohol solution (produced by The Nippon Synthetic Chemical Industry Co., Ltd.) in a reaction vessel with a stirrer. The resulting mixture was heated under stirring, and polymerized under nitrogen atmosphere at a temperature of 80° C. for one hour. Next, as the monomer having the ion exchange group, 100 g of 2-methacrylamide-2-methylpropanesulfonic acid (produced by TOAGOSEI CO., LTD.) and 100 g of polyethylene glycol methacrylate (produced by NOF CORPORATION, ethylene glycol chain n=4) were dissolved in an ion-exchanged water. This mixture was added to the same reaction vessel, and similarly polymerized at a temperature of 80° C. under stirring under nitrogen atmosphere for two hours. Filler particles having a sulfonic acid group as the ion exchange group were obtained by washing the obtained polymerizable composition with water and acetone.

The average particle diameter and the CV value were measured for the obtained coated polymer particles using a laser diffraction-type particle size distribution measuring apparatus, and gave values of 8 μm and 14%, respectively.

(2) Hydrophilization Treatment by Ozone Water

An amount of 10 g of the obtained filler particles were immersed in 300 mL of an ozone water with a dissolved ozone gas concentration of 130 ppm, under stirring, and irradiated with the ultraviolet rays for 300 seconds at irradiation intensity of 95 mW/cm$^2$ from 1 cm distance apart using the spot-type UV irradiation device (UP-200G produced by EYE GRAPHICS CO., LTD.) which can irradiate with the ultraviolet rays including a wavelength of 254 nm, so as to perform the hydrophilization treatment. After the irradiation with the ultraviolet rays, centrifugal separation was carried out using the centrifugal separator (Himac CR20G produced by Hitachi, Ltd.) to remove supernatant fluid. These processes were repeated twice, and the hydrophilization treatment was carried out to obtain a filler for the ion-exchange chromatography.

Here, the ozone water was prepared using the ozone water production system (produced by Sekisui Chemical Co., Ltd.) including an ozone dissolution module containing 400 ozone gas permeable membranes, each of which has a shape of a tubular hollow in a size of 0.5 mm×0.04 mm×350 cm in inside diameter, thickness and length, and is made of perfluoroalkoxy resin, in a coat having a round pillar shape and a size of 15 cm×20 cm in inside diameter and length.

Comparative Example 14

The filler particles having the sulfonic acid group as the ion exchange group prepared in Example 11 were used as the filler for ion-exchange liquid chromatography as they are, without the hydrophilization treatment by ozone water.

Comparative Example 15

A filler for ion-exchange liquid chromatography was obtained by the hydrophilization treatment in the same manner as that of Example 11 except that an ozone water with the dissolved ozone gas concentration of 10 ppm was used in the hydrophilization treatment by the ozone water.

Comparative Example 16

A filler for ion-exchange liquid chromatography was obtained by the hydrophilization treatment in the same manner as that of Example 11 except that the treatment by an advanced oxidation method was not carried out in the hydrophilization treatment by the ozone water.

Comparative Example 17

An amount of 200 mL of 0.2% by weight of bovine serum albumin (BSA) dissolved in a phosphate buffer (pH 5.7) was added to 10 g of the filler particles having the sulfonic acid group as the ion exchange group prepared in Example 11, the obtained solution was subjected to ultrasonic treatment for two minutes, stirred gently in a constant-temperature bath at a temperature of 80° C. for 24 hours, and then taken out from the constant-temperature bath and allowed to stand until the temperature of the resulting solution became a room temperature. Subsequently, after removal of supernatant fluid by centrifugal separation, 200 mL of the phosphate buffer (pH 8.5) was added, and supernatant fluid was removed by centrifugal separation again. Thereafter, 200 mL of the phosphate buffer (pH 5.7) was added, and supernatant fluid was removed by third-time centrifugal separation to obtain a filler for ion-exchange liquid chromatography coated with BSA fixed thereon by physical adsorption.

<Evaluation>

The following evaluations were carried out for each of the fillers for ion-exchange liquid chromatography obtained in Example 11 and Comparative Examples 14 to 17. Tables 11 to 13 show the results.

(3) Measurement of Contact Angle

The contact angle was measured for each of the filler particles obtained in Example 11 and Comparative Examples 14 and 16. An automatic contact angle meter (Dropmaster500 produced by Kyowa Interface Science Co., Ltd.) was used for the measurement. The dried filler particles were placed evenly on a double-stick tape attached to a slide glass, and then excessive particles were removed by an air spray. Thereby, a layer of the filler particles was fixed on the double-stick tape. These processes were observed by a microscope.

A droplet of 1 μL of an ion-exchanged water was prepared and placed onto the filler particles fixed on the slide glass, and the contact angle was calculated based on the θ/2 method. In case of using filler particles having a contact angle with water of less than 90°, the droplet placed tends to spread. Therefore, the contact angle after the placement of the droplet decreases with the lapse of time. For this reason, the evaluation was carried out using a contact angle value 0.5 seconds after from the placement of the droplet.

Table 11 shows the results.

(4) Evaluation of Hemoglobins (Hb) Recovery Ratio Based on Hemoglobin A1c Measurement Columns for a liquid chromatography system were filled with one of the fillers for ion-exchange liquid chromatography produced in Example 11 and Comparative Examples 14 to 16. At the same time, glyco Hb control level 2 (produced by Sysmex International Reagents Co., Ltd., pro form a amount of 10.4±0.5%) was dissolved in 200 μL of water for injection, and then diluted 100 fold with a diluent (phosphate buffer (pH 7.0) containing 0.1% of Triton X-100) to prepare a sample to be measured.

The amount of hemoglobin A1c and the total amount of hemoglobin A1c and non-glycosylated hemoglobin in the sample to be measured were evaluated based on peak areas of a chromatogram using the obtained column under the following conditions. A total of 10 samples were successively measured, and average values of the area value of the hemoglobin A1c peak and the sum of an area values of hemoglobin A1c peak and non-glycosylated hemoglobin peak were calculated using the latter five samples and determined as measured values.

Table 12 and FIG. 5 show the results. FIG. 5 shows a hemoglobin A1c peak area value and a total sum of peak area values of the hemoglobin A1c and the non-glycosylated hemoglobin obtained in Example 11 as 100% to compare peak areas obtained in Example 11 and Comparative Examples 14 to 16.

System:
Feed Pump LC-9A (produced by Shimadzu Corp.)
Auto sampler ASU-420 (produced by Sekisui Chemical Co., Ltd.)
Detector SPD-6AV (produced by Shimadzu Corp.)
Eluent:
first solution 170 mM of phosphate buffer (pH 5.7)
second solution 300 mM of phosphate buffer (pH 8.5)
Elution method: Elution was carried out with the first solution in a period of 0 to 3 minutes, with the second solution in a period of 3 to 3.2 minutes and with the first solution in a period of 3.2 to 4 minutes.
Flow velocity: 1.0 mL/min
Detection wavelength: 415 nm
Sample injection amount: 10 μL

(5) Evaluation of Variation in Measured Values in Hemoglobin A1c Measurement Durability Evaluation Columns for a liquid chromatography system were filled with one of the fillers for ion-exchange liquid chromatography produced in Example 11 and Comparative Example 17. At the same time, glyco Hb control level 2 (produced by Sysmex International Reagents Co., Ltd., pro form a amount of 10.4±0.5%) was dissolved in 200 μL of water for injection, and then diluted 100 fold with a diluent (phosphate buffer (pH 7.0) containing 0.1% of Triton X-100) to prepare a sample to be measured. Moreover, a blood sample was collected from a healthy human using NaF, hemolysed with a hemolysing agent (phosphate buffer containing 0.1% by weight of Triton X-100 (pH 7.0)), and then diluted 150 fold to prepare a load sample.

A total of about 1000 samples of sample to be measured and load samples were measured, 10 samples to be measured were continuously measured at arbitrary intervals, and average values thereof were used for the evaluation. Under the following conditions, the amounts of hemoglobin A1c and non-glycosylated hemoglobin in samples to be measured were measured, and a proportion of hemoglobin A1c to a sum of hemoglobin A1c and non-glycosylated hemoglobin was determined. Moreover, the retention time of hemoglobin A1c was also measured.

Table 13 shows the results.

System:
Feed Pump LC-9A (produced by Shimadzu Corp.)
Auto sampler ASU-420 (produced by Sekisui Chemical Co., Ltd.)
Detector SPD-6AV (produced by Shimadzu Corp.)
Eluent:
first solution 170 mM of phosphate buffer (pH 5.7)
second solution 300 mM of phosphate buffer (pH 8.5)
Elution method: Elution was carried out with the first solution in a period of 0 to 3 minutes, with the second solution in a period of 3 to 3.2 minutes and with the first solution in a period of 3.2 to 4 minutes.
Flow velocity: 1.0 mL/min
Detection wavelength: 415 nm
Sample injection amount: 10 μL

TABLE 11

|  | Contact angle (°) |
|---|---|
| Example 11 | 32 |
| Comparative Example 14 | 65 |
| Comparative Example 16 | 40 |

TABLE 12

|  | A1cArea | TotalArea |
|---|---|---|
| Example 11 | 100% | 100% |
| Comparative Example 14 | 87% | 85% |
| Comparative Example 15 | 89% | 88% |
| Comparative Example 16 | 95% | 99% |

TABLE 13

|  | Example 11 | | Comparative Example 17 | |
|---|---|---|---|---|
| Number of samples | Retention time (sec) | Hemoglobin A1c value (%) | Retention time (sec) | Hemoglobin A1c value (%) |
| 50 | 119.2 | 10.4 | 120.0 | 10.4 |
| 100 | 118.8 | 10.5 | 119.4 | 10.6 |
| 150 | 118.7 | 10.5 | 119.1 | 10.5 |
| 200 | 118.6 | 10.5 | 118.8 | 10.3 |
| 250 | 118.6 | 10.4 | 119.4 | 10.5 |
| 300 | 118.6 | 10.5 | 119.9 | 10.6 |
| 400 | 118.6 | 10.5 | 120.6 | 10.5 |
| 500 | 118.5 | 10.5 | 121.1 | 10.4 |
| 600 | 118.6 | 10.5 | 121.5 | 10.5 |
| 700 | 118.5 | 10.5 | 121.9 | 10.6 |
| 800 | 118.5 | 10.5 | 122.2 | 10.4 |
| 900 | 118.5 | 10.5 | 122.5 | 10.5 |
| 1000 | 118.5 | 10.5 | 122.8 | 10.5 |
| Average | 118.6 | 10.5 | 120.7 | 10.5 |
| Standard deviation | 0.19 | 0.04 | 1.38 | 0.09 |
| Variation coefficient | 0.2 | 0.4 | 1.1 | 0.9 |

As shown in Table 11, in Example 11, the contact angle was smaller by 8° than that of Comparative Example 16 in which only the ozone water treatment was carried out, and the results indicate an increase in hydrophilicity of the surface of the filler particles owing to the treatment by the advanced oxidation method.

As shown in Table 12 and FIG. 5, both of the A1cArea and TotalArea of the Example 11, in which the treatment by the advanced oxidation method was carried out, were larger than those of Comparative Examples 14 to 16. That is, the results indicate that adsorption of the hemoglobin A1c composition or another hemoglobin composition on the surface of the filler particles was suppressed.

As shown in Table 13, in case of using the filler for ion-exchange liquid chromatography produced in Example 11, during measurement of 1000 samples, there were significantly small variations in the hemoglobin A1c values (%) and the retention times, so that accurate measurement could be achieved. On the other hand, in Comparative Example 17, the retention times were varied greatly. Detachment of protein coating for improving hydrophilicity during the measurement is considered to cause the variation.

INDUSTRIAL APPLICABILITY

According to the present invention, it is possible to provide: a hydrophilic polymer microparticle which shows reduced swelling in an aqueous medium and an excellent dispersibility in an aqueous medium; a filler for ion-exchange liquid chromatography which can effectively suppress non-specific adsorption of protein and the like; a method for analyzing glycosylated hemoglobin by using the filler for ion-exchange liquid chromatography; a method for production of a filler for ion-exchange liquid chromatography that can maintain suppressive effects on swelling; non-specific adsorption and the like for a long period of time; a filler for ion-exchange liquid chromatography produced by the method for production of a filler for ion-exchange liquid chromatography; and a filler for ion-exchange liquid chromatography for glycosylated hemoglobin analysis.

BRIEF DESCRIPTION OF THE DRAWINGS

FIG. 1 is a graph showing the results of hemoglobin (Hb) recovery ratios based on hemoglobin A1c measurement in Example 3 and Comparative Example 5.

FIG. 2 is a graph showing the results of Hb recovery ratios based on hemoglobin A1c measurement in Example 4, Comparative Example 6, and Comparative Example 7.

FIG. 3 is a graph showing the result of Hb recovery ratios based on hemoglobin A1c measurement in Example 6, Comparative Example 8, and Comparative Example 9.

FIG. 4 is a graph showing the measured value variations in hemoglobin A1c measurement in durability evaluation.

FIG. 5 is a graph showing the result of the hemoglobin (Hb) recovery ratios based on hemoglobin A1c measurement in Example 11 and Comparative Examples 14 to 16.

The invention claimed is:

1. A filler for ion-exchange liquid chromatography, which comprises a hydrophobic crosslinked polymer particle including a synthetic organic polymer, and a layer of a hydrophilic polymer having an ion exchange group copolymerized on the surface of said hydrophobic crosslinked polymer particle, the filler having the uppermost surface processed with hydrophilic treatment using an ozone water.

2. The filler for ion-exchange liquid chromatography according to claim 1, which has a contact angle with water of 60° or less.

3. The filler for ion-exchange liquid chromatography according to claim 1, wherein a concentration of the ozone water is 20 ppm or more.

4. The filler for ion-exchange liquid chromatography according to claim 1, wherein the ion exchange group is a sulfonic acid group.

* * * * *